US008612395B2

(12) United States Patent  
Saika

(10) Patent No.: US 8,612,395 B2  
(45) Date of Patent: Dec. 17, 2013

(54) SERVER APPARATUS AND CONTROL METHOD OF THE SAME

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 125 days.

(21) Appl. No.: 12/935,892

(22) PCT Filed: Sep. 14, 2010

(86) PCT No.: PCT/JP2010/005593  
§ 371 (c)(1),  
(2), (4) Date: Sep. 30, 2010

(87) PCT Pub. No.: WO2012/035574  
PCT Pub. Date: Mar. 22, 2012

(65) Prior Publication Data  
US 2012/0066179 A1    Mar. 15, 2012

(51) Int. Cl.  
*G06F 7/00* (2006.01)  
*G06F 17/00* (2006.01)  
*G06F 17/30* (2006.01)

(52) U.S. Cl.  
USPC .......................... 707/665; 707/666; 707/667

(58) Field of Classification Search  
USPC ...................... 707/665, 999.001–999.005  
See application file for complete search history.

(56) References Cited

U.S. PATENT DOCUMENTS

| | | | |
|---|---|---|---|
| 5,946,686 A * | 8/1999 | Schmuck et al. | 707/783 |
| 6,092,163 A * | 7/2000 | Kyler et al. | 711/163 |
| 7,783,666 B1 * | 8/2010 | Zhuge et al. | 707/783 |
| 7,913,053 B1 * | 3/2011 | Newland | 711/172 |
| 7,937,453 B1 * | 5/2011 | Hayden et al. | 707/607 |
| 2002/0023156 A1 * | 2/2002 | Chujo et al. | 709/226 |
| 2005/0044198 A1 * | 2/2005 | Okitsu et al. | 709/223 |
| 2005/0097126 A1 * | 5/2005 | Cabrera et al. | 707/102 |
| 2006/0129537 A1 | 6/2006 | Torii et al. | |
| 2007/0179990 A1 * | 8/2007 | Zimran et al. | 707/201 |
| 2008/0109820 A1 * | 5/2008 | Raghunandan | 719/313 |
| 2009/0300079 A1 | 12/2009 | Shitomi | |
| 2009/0304362 A1 * | 12/2009 | Neufeld et al. | 386/124 |
| 2010/0017445 A1 * | 1/2010 | Kobayashi | 707/204 |

FOREIGN PATENT DOCUMENTS

| | | |
|---|---|---|
| EP | 0 515 073 A2 | 11/1992 |
| JP | 2006-164211 | 6/2006 |
| WO | WO-2004/021224 A1 | 3/2004 |
| WO | WO-2006/055765 A2 | 5/2006 |

* cited by examiner

*Primary Examiner* — Kannan Shanmugasundaram  
(74) *Attorney, Agent, or Firm* — Foley & Lardner LLP

(57) ABSTRACT

File migration is allowed to be properly performed while suppressing an adverse effect caused by the migration on other users. A first server apparatus 3a is communicatively coupled to a first storage apparatus 10a, and a second server apparatus 3b that is communicatively coupled to a second storage apparatus 10b, and performs management based on user quota such that a file owned by a user having a used amount exceeding a threshold based on the user quota is set as a target of migration to the second storage apparatus 10b. A file used by a plurality of users out of the files set as targets of migration is excluded from a target of the management based on user quota, and is set as a target of management based on a file quota that is the user quota supplied from a plurality of users who use the file. If the capacity of the file exceeds the file quota, the file is again set to a target of the management based on user quota.

15 Claims, 41 Drawing Sheets

Fig. 13

USER QUOTA MANAGEMENT TABLE 331

| USER NAME | USER QUOTA [MB] | USED AMOUNT [MB] |
|---|---|---|
| User01 | 2000 | 1000 |
| User02 | 2000 | 1500 |
| User03 | 2000 | 1100 |
| ⋮ | ⋮ | ⋮ |

FILE QUOTA MANAGEMENT TABLE 332

| FILE NAME | FILE QUOTA [MB] | NUMBER OF USERS | USER ID/PROVIDED QUOTA | USER ID/PROVIDED QUOTA | USER ID/PROVIDED QUOTA | USED AMOUNT |
|---|---|---|---|---|---|---|
| a.txt | 50 | 2 | User01/25 | User02/25 | | 40/40 |
| b.txt | 60 | 3 | User01/20 | User02/20 | User03/20 | 50/50 |
| c.txt | 70 | 3 | User04/10 | User05/20 | User06/40 | 60/60 |

3321  3322  3323  3324  3325  3326  3327

FILE ACCESS LOG  335

| 3351 | 3352 | 3353 |
|---|---|---|
| 2010/6/16 12:00:00 | /home/user01/a.txt | user01 |
| 2010/6/16 12:10:00 | /home/user02/b.txt | user02 |
| 2010/6/16 12:20:00 | /home/user01/a.txt | user03 |
| : | : | : |

Fig. 20 inode MANAGEMENT TABLE 1712

| inode NUMBER | OWNER | ACCESS RIGHT | SIZE | UPDATE DATE/TIME | PARENT DIRECTORY | inode NUMBER OF CHILD DIRECTORY |
|---|---|---|---|---|---|---|
| 2 | ... | ... | ... | 2009/12/23 12:00:00 | / | 10 |
| 10 | ... | ... | ... | 2009/12/23 12:00:00 | home | 15 |
| 15 | ... | ... | ... | 2009/12/23 12:00:00 | user-01 | 100 |

2011  2012  2013  2014  2015  2016  2017

| inode NUMBER | OWNER | ACCESS RIGHT | SIZE | UPDATE DATE/TIME | DATA BLOCK ADDRESS 1 | DATA BLOCK ADDRESS 2 | DATA BLOCK ADDRESS 3 |
|---|---|---|---|---|---|---|---|
| 100 | user001 | u:g:w rxw rxw | 1000KB | 2009/12/23 12:00:00 | 100-3 | 200-2 | 250-5 |

2011  2012  2013  2014  2015  2018

1713 DATA BLOCK...

Fig. 21 inode MANAGEMENT TABLE 1712

| inode NUMBER (2011) | OWNER (2012) | ACCESS RIGHT (2013) | SIZE (2014) | UPDATE DATE/TIME (2015) | ... |
|---|---|---|---|---|---|
| : | : | : | : | : | ... |
| : | : | : | : | : | ... |
| : | : | : | : | : | ... |

| STUB FLAG (2111) | METADATA SYNCHRONIZATION REQUIRED FLAG (2112) | DATA ENTITY SYNCHRONIZATION REQUIRED FLAG (2113) | REPLICATION FLAG (2114) | LINK DESTINATION (2115) |
|---|---|---|---|---|
| : | : | : | : | : |
| ON or OFF | ON or OFF | ON or OFF | ON or OFF | www.xxx.co.jp/... |
| : | : | : | : | : |

2018

| ... | DATA BLOCK ADDRESS 1 | DATA BLOCK ADDRESS 2 | DATA BLOCK ADDRESS 3 | ... |
|---|---|---|---|---|
| ... | : | : | : | ... |
| ... | : | : | : | ... |
| ... | : | : | : | ... |

MIGRATION FILE REFERENCE PROCESSING S2900

Fig. 31

USER QUOTA MANAGEMENT TABLE 331

3311　　　　　　3312　　　　　　3313

| USER NAME | QUOTA [MB] | USED AMOUNT [MB] |
|---|---|---|
| User01 | 2000 | 1000 |
| User02 | 2000 | 1500 |
| User03 | 2000 | 1100 |

Fig. 32

```
/home/User01/a.txt      User01      25 TIMES
/home/User02/a.txt      User02      35 TIMES
/home/User03/a.txt      User03      40 TIMES
```

Fig. 33

FILE QUOTA MANAGEMENT TABLE 332

| 3321 | 3322 | 3323 | 3324 | 3325 | 3326 | 3327 |
|---|---|---|---|---|---|---|
| FILE NAME | QUOTA [MB] | NUMBER OF USERS | USER ID/ PROVIDED QUOTA | USER ID/ PROVIDED QUOTA | USER ID/ PROVIDED QUOTA | USED AMOUNT |
| a.txt | 150 | 3 | User01/37.5 | User02/52.5 | User03/60.0 | 100MB/100MB |

Fig. 34

USER QUOTA MANAGEMENT TABLE 331

| USER NAME | QUOTA [MB] | USED AMOUNT [MB] |
|---|---|---|
| User01 | 2000−37.5=1962.5 | 1000 |
| User02 | 2000−52.5=1947.5 | 1500 |
| User03 | 2000−40.0=1960.0 | 1100 |

Fig. 35

USER QUOTA MANAGEMENT TABLE 331

| USER NAME | QUOTA [MB] | USED AMOUNT [MB] |
|---|---|---|
| User01 | 1962.5+37.5=2000 | 1000+12.5=1012.5 |
| User02 | 1947.5+52.5=2000 | 1500+17.5=1517.5 |
| User03 | 1960.0+40.0=2000 | 1100+20.0=1120 |

SERVER APPARATUS AND CONTROL METHOD OF THE SAME

TECHNICAL FIELD

The present invention relates to a server apparatus and a control method of the same, and particularly, to a technology for properly performing migration of a file while suppressing an adverse effect caused by the migration on other users.

BACKGROUND ART

PTL 1 discloses a technology relating to migrating file data between two servers (file servers), and describes a system including a client, a first server having a primary storage, a second server having a secondary storage, and a control device. In this system, a stub file in which location information of a real file migrated from the primary storage to the secondary storage has been recorded is located in the primary storage. Upon receipt of a file access request to the primary storage of the first server from the client, the control device determines whether the access target file is a stub file. When determining that the access target file is a stub file and that the file access request requires access to the real file, the control device accesses to the real file in the secondary storage based on the information of the stub file and returns a response to the client.

According to PTL 1, a file stubbing is triggered when the storage capacity reaches a threshold, stubbing is performed from a file that has not been accessed, and a file accessed at an earlier time is migrated to a lower layer according to an assigned quota value.

CITATION LIST

Patent Literature

PTL 1: Japanese Patent Application laid-open Publication No. 2006-164211

SUMMARY OF INVENTION

Technical Problem

In the system configured to perform stubbing when the storage capacity reaches a threshold as described above, an increase in the file size (data size) of a file owned by a user accessing the file server results in a situation where a file owned by another user is also stubbed. In this case, re-call (acquisition of the real file from the second server) occurs when the other user accesses the real file. This adversely affects the service for other users, i.e., reduces access performance, for example. Also, in the system configured to perform stubbing according to the assigned quota value, if a file owned by a user is used (shared) by other users, migration and stubbing of the file owned by the user adversely affects the other users accessing the file.

The present invention has been made in view of such a background, and it is a primary object of the invention to provide a server apparatus and a control method of the same with which migration of a file can be performed properly while suppressing an adverse effect caused by the migration on other users.

Solution to Problem

One aspect of the present invention to achieve the above object provides a server apparatus that is a first server apparatus communicatively coupled to a client apparatus, a first storage apparatus, and a second server apparatus that is communicatively coupled to a second storage apparatus, wherein the first server apparatus performs writing or reading of data of a file stored in the first storage apparatus, when receiving an access request to a file from the client apparatus; manages a user quota that is information defining a limit of a used amount of storage resources by each user; performs management based on the user quota where a file owned by a user is set as a target of migration to the second storage apparatus when the used amount of the user exceeds a threshold based on the user quota; excludes a file, out of the files specified as targets of migration, used by a plurality of users from a target of the management based on the user quota, and sets the file as a target of management based on a file quota that is information defining a limit of capacity for each file, the file quota being the user quota supplied from the plurality of users who use the file; and excludes the file from a target of the management based on the file quota, and sets the file as a target of the management based on the user quota when a capacity of a file set as a target of the management based on the file quota exceeds a threshold based on the file quota.

Other problems and solutions disclosed in the present application will be made apparent from the description of embodiments as well as the drawings.

Advantageous Effects of Invention

According to the present invention, file migration can be properly performed while suppressing an adverse effect caused by the migration on other users.

BRIEF DESCRIPTION OF DRAWINGS

FIG. 12 is a diagram showing the main functions provided by the first server apparatus 3a, and the main information (data) managed in the first server apparatus 3a.

FIG. 13 is an example of a user quota management table 331.

FIG. 14 is an example of a file quota management table 332.

FIG. 20 is an example of an inode management table 1712.

FIG. 21 is a diagram showing the configuration of the inode management table 1712 of the present embodiment.

FIG. 31 is an example of the user quota management table 331.

FIG. 32 is an example of information acquired based on the file access log 335.

FIG. 33 is an example of the file quota management table 332.

FIG. 34 is an example of the user quota management table 331.

FIG. 35 is an example of the user quota management table 331.

DESCRIPTION OF EMBODIMENTS

In the following, embodiments are described with reference to the drawings.

Figure 1:
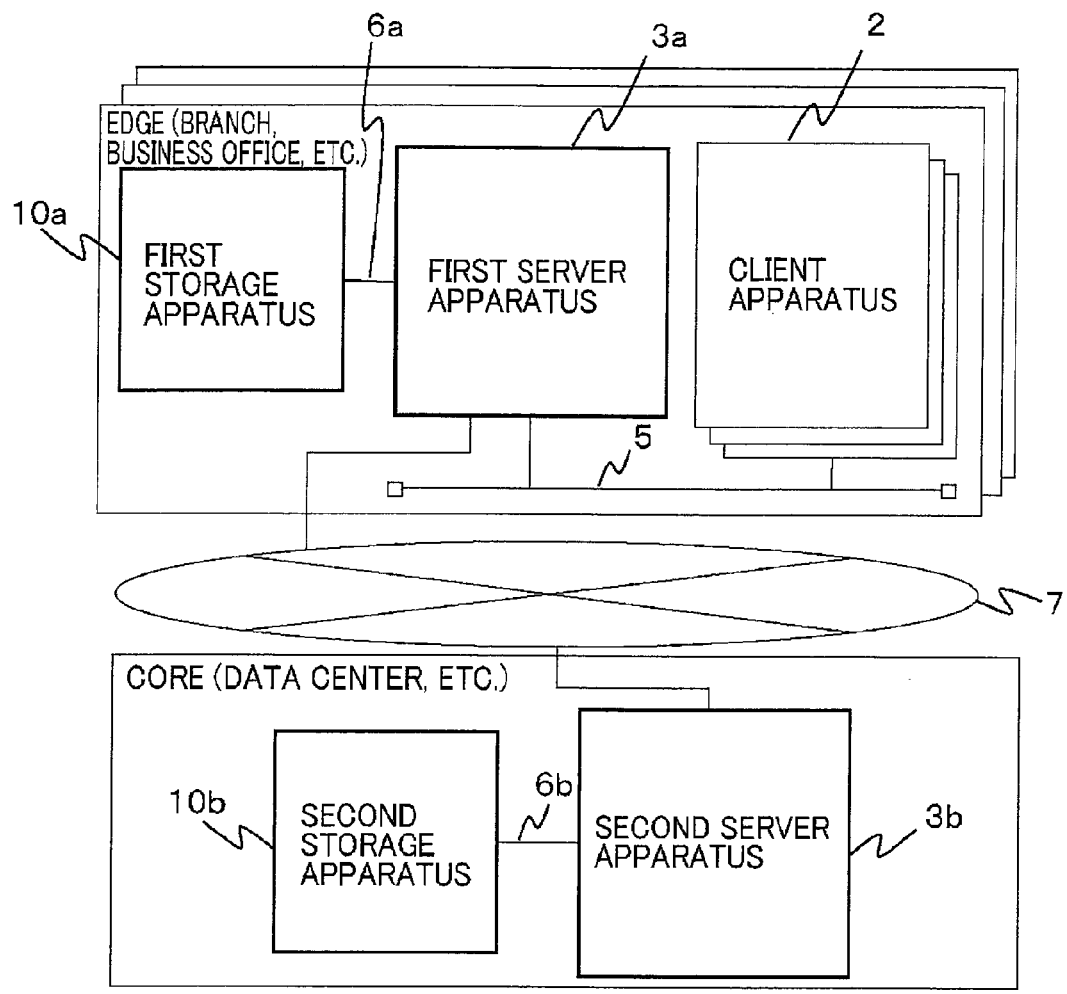
FIG. 1 is a diagram showing a schematic configuration of an information processing system 1.

FIG. 1 shows a schematic configuration of an information processing system 1 described as an embodiment. As shown in FIG. 1, the information processing system 1 includes a first server apparatus 3a, a first storage apparatus 10a, a client apparatus 2 (server apparatus), a second server apparatus 3b, and a second storage apparatus 10b.

In these, the first server apparatus 3a is a file storage apparatus having a file system that provides, for example, per-file data management function to the client apparatus 2. The second server apparatus 3b is, for example, an archive apparatus that serves as an archive destination (library) of the data which the first server apparatus 3a manages in the first storage apparatus 10a.

The first server apparatus 3a, the first storage apparatus 10a, and the client apparatus 2 are provided to, for example, a place (Edge) where a user actually performs business operations such as a branch or a business office of a company. The second server apparatus 3b and the second storage apparatus 10b are provided to, for example, a place of service (Core) such as a data center where an information processing system (application server/storage system, and the like) used in a company is managed or cloud service is provided.

As shown in FIG. 1, the client apparatus 2 and the first server apparatus 3a are communicatively coupled together via a communication network 5. Also, the first server apparatus 3a and the first storage apparatus 10a are communicatively coupled together via a first storage network 6a. Also, the second server apparatus 3b and the second storage apparatus 10b are communicatively coupled together via a second storage network 6b. Also, the first server apparatus 3a and the second server apparatus 3b are communicatively coupled together via a communication network 7.

The communication network 5 and the communication network 7 are, for example, a LAN (Local Area Network), a WAN (Wide Area Network), the Internet, a public communication network, a private line, and the like. Also, the first storage network 6a and the second storage network 6b are, for example, a LAN, a WAN, a SAN (Storage Area Network), the Internet, a public communication network, a private line, and the like.

Communication via the communication network 5, the communication network 7, the first storage network 6a, or the second storage network 6b is performed in accordance with a specific protocol such as, for example, TCP/IP, iSCSI (internet Small Computer System Interface), fibre channel protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The client apparatus 2 is an information apparatus (computer) that uses a storage area provided by the first storage apparatus 10a via the first server apparatus 3a, and is, for example, a personal computer, an office computer, and the like. In the client apparatus 2, operating systems such as a file system and a kernel and/or driver that is implemented by executing software modules, and an application, and the like are operated.

Figure 2:
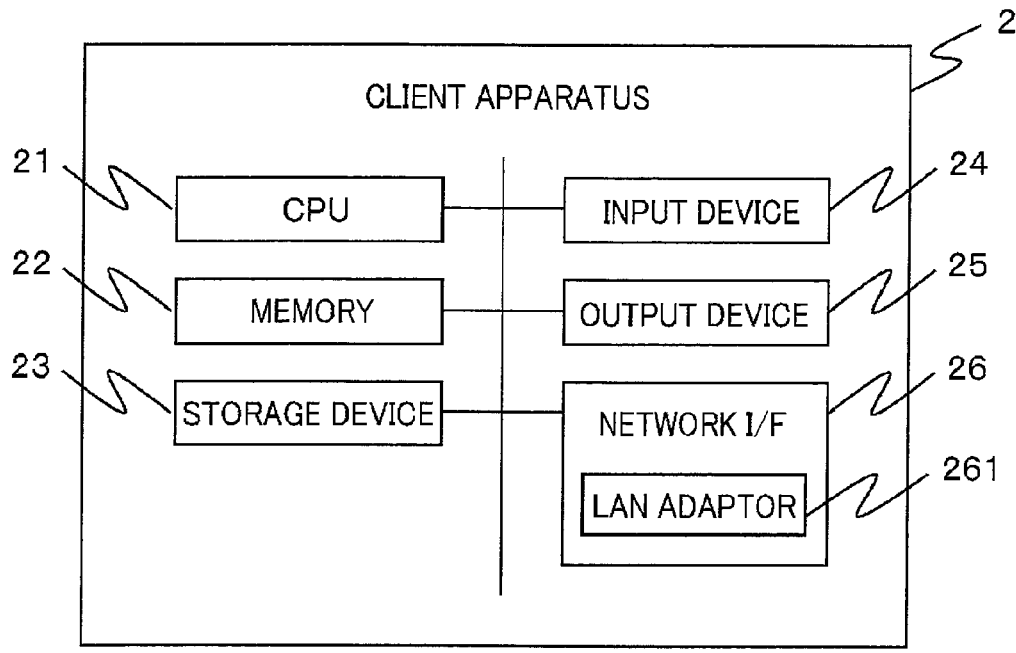
FIG. 2 is an example of hardware of a client apparatus 2.

FIG. 2 shows an example of hardware of the client apparatus 2. As illustrated in FIG. 2, this apparatus includes a CPU 21, a volatile or nonvolatile memory 22 (RAM or ROM), a storage device 23 (e.g., a hard disk drive, a semiconductor memory (SSD (Solid State Drive)), an input device 24 such as a keyboard and a mouse, an output device 25 such as a liquid crystal monitor and a printer, and a network interface (hereinafter, network I/F 26) such as an NIC (Network Interface Card) (hereinafter, LAN adaptor 261).

The first server apparatus 3a is an information apparatus that utilizes a storage area (data storage area) provided by the first storage apparatus 10a. The first server apparatus 3a is configured by using a personal computer, a mainframe, an office computer, or the like. Upon an access to the storage area, the first server apparatus 3a sends a data frame (hereinafter, abbreviated as frame) including a data I/O request (such as data write request or data read request) to the first storage apparatus 10a through the first storage network 6a. The frame is, for example, a fibre channel frame (FC frame).

The second server apparatus 3b is an information apparatus that utilizes a storage area (data storage area) provided by the second storage apparatus 10b. The second server apparatus 3b is configured by using a personal computer, a mainframe, an office computer, or the like. Upon an access to the storage area, the second server apparatus 3b sends a frame including a data I/O request to the second storage apparatus 10b through the second storage network 6b.

Figure 3:
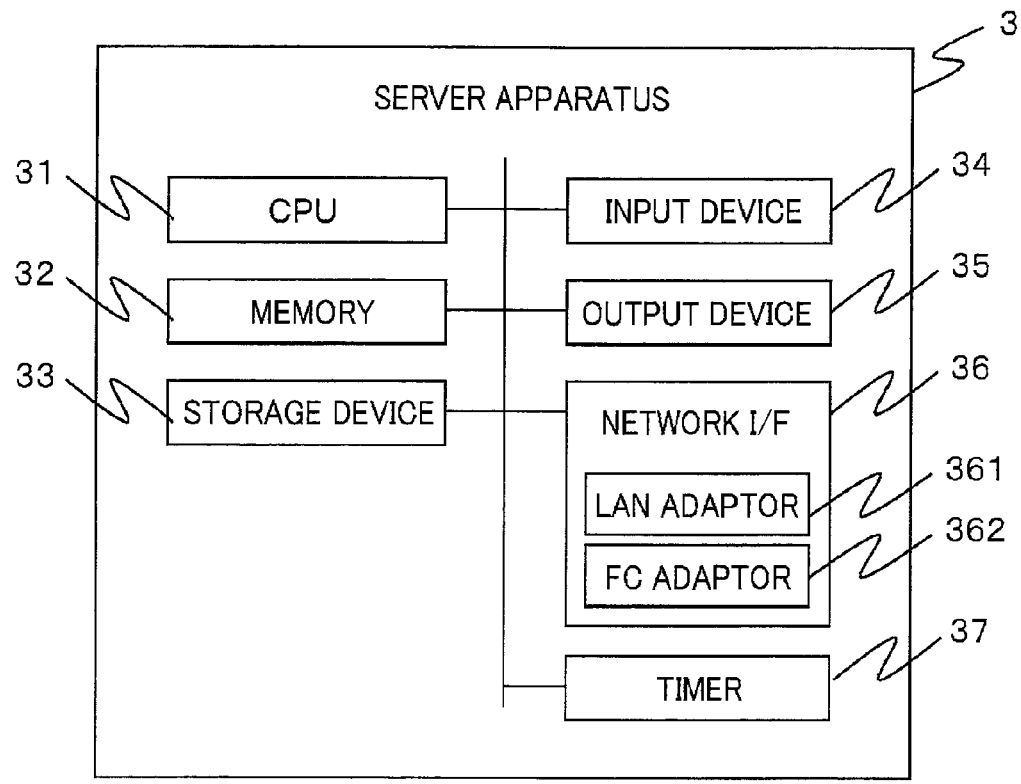
FIG. 3 is an example of hardware of an information apparatus that can be used as a first server apparatus 3a or a second server apparatus 3b.

FIG. 3 shows an example of hardware of an information apparatus that can be used as the first server apparatus 3a or the second server apparatus 3b. As illustrated in FIG. 3, this apparatus includes a CPU 31, a volatile or nonvolatile memory 32 (RAM or ROM), a storage device 33 (e.g., a hard disk drive, a semiconductor memory (SSD (Solid State Drive)), an input device 34 such as a keyboard and a mouse, an output device 35 such as a liquid crystal monitor and a printer, a network interface (hereinafter, network I/F 36) such as an NIC (Network Interface Card) (hereinafter, LAN adaptor 361) and an HBA (hereinafter, FC adaptor 362), and a timer 37 including a timer circuit, a RTC, and the like.

Figure 4:
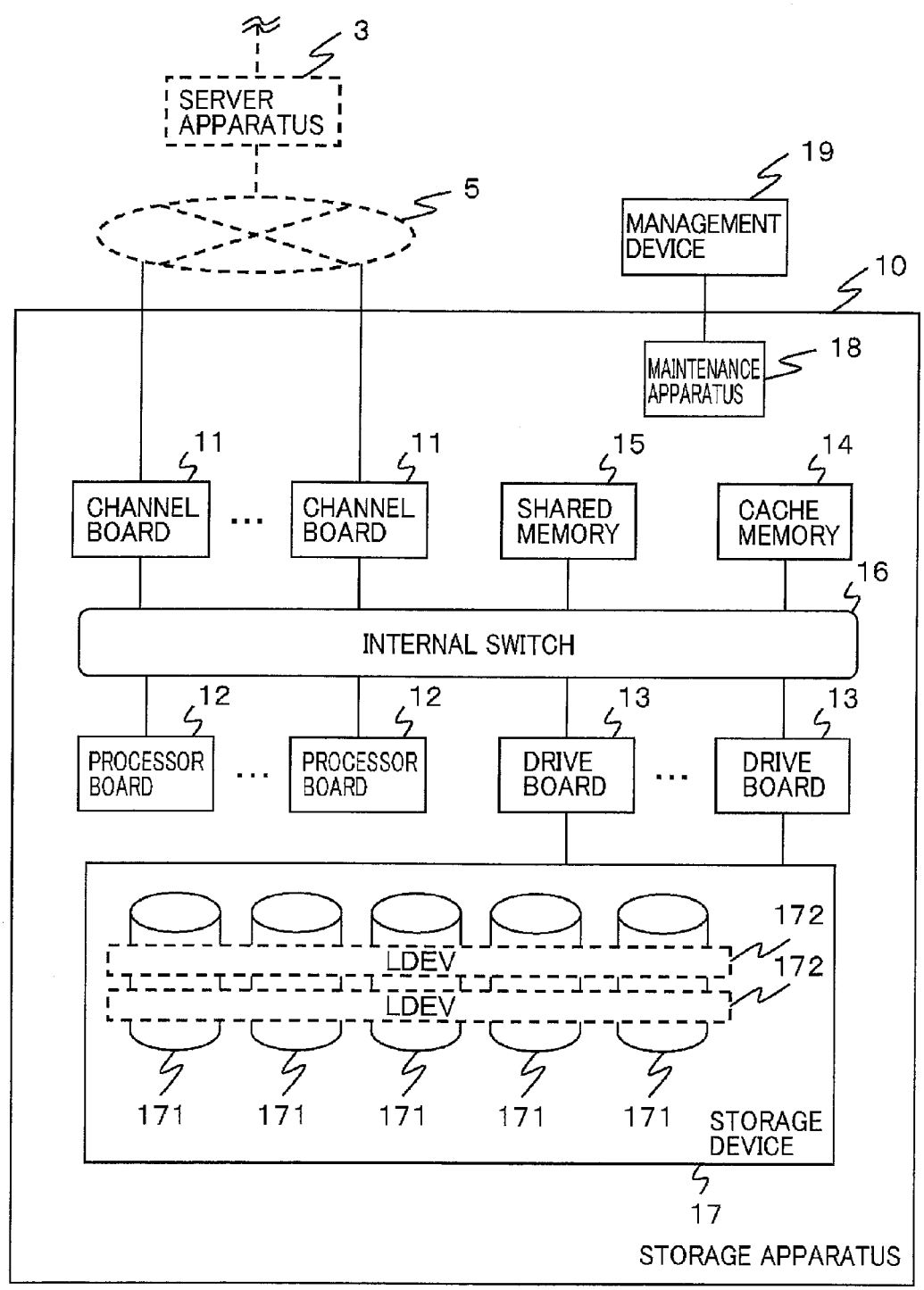
FIG. 4 is an example of hardware of a first storage apparatus 10a or a second storage apparatus 10b.

FIG. 4 shows an example of hardware of the first storage apparatus 10a or the second storage apparatus 10b. The first storage apparatus 10a and the second storage apparatus 10b are, for example, a disk array apparatus. As illustrated in FIG. 4, in response to the data I/O request sent from the server apparatus 3 (the first server apparatus 3a or the second server apparatus 3b, the same applies in the following), the storage apparatus 10 accesses a storage media and sends data and a response to the server apparatus 3.

As illustrated in FIG. 4, the storage apparatus 10 includes at least one channel board 11, at least one processor board 12 (Micro Processor), at least one drive board 13, a cache memory 14, a shared memory 15, an internal switch 16, a storage device 17, and a maintenance device 18 (SVP: Service Processor). The channel board 11, the processor board 12, the drive board 13, the cache memory 14, and the shared memory 15 are communicatively coupled with each other via the internal switch 16.

The channel board 11 receives a frame sent from the server apparatus 3 and sends the server apparatus 3, a frame including a response (e.g., read data, report on completion of reading, or report on completion of writing) to the data I/O request in the received frame.

In response to the data I/O request in the frame received by the channel board 11, the processor board 12 performs processing related to data transfer (high-speed large capacity data transfer using DMA (Direct Memory Access) and the like) among the channel board 11, the drive board 13, and the cache memory 14. The processor board 12 transfers (delivers) data (data read from the storage device 17 or data to be written into the storage device 17) between the channel board 11 and the drive board 13 via the cache memory 14. The processor board 12 also performs such as staging (reading of data from the storage device 17) and de-staging (writing of data into the storage device 17) of data stored in the cache memory 14.

The cache memory 14 is configured by using a RAM (Random Access Memory) capable of high-speed access. The cache memory 14 stores therein data to be written into the storage device 17 (hereinafter, write data), data read from the storage device 17 (hereinafter, read data), and the like. The shared memory 15 stores therein various kinds of information used for controlling the storage apparatus 10.

The drive board 13 performs communication with the storage device 17 in case of an event where data is read from the storage device 17 or data is written into the storage device 17. The internal switch 16 is configured by using for example a high-speed cross bar switch. The communication via the internal switch 16 is performed according to a protocol such as fiber channel, iSCSI, or TCP/IP.

The storage device 17 includes a plurality of storage drives 171. Each storage drive 171 is for example a hard disk drive or a semiconductor memory (SSD) of such type as SAS (Serial Attached SCSI), SATA (Serial ATA), FC (Fibre Channel), PATA (Parallel ATA), SCSI, or the like.

The storage device 17 provides the server apparatus 3, storage areas of the storage device 17 consisting of unit logical storage areas obtained by controlling the storage drives 171 in accordance with, for example, a RAID (Redundant Arrays of Inexpensive (or Independent) Disks) scheme or the like. The logical storage areas are for example logical devices (LDEVs 172 (LDEV: Logical Device)) configured by using a RAID group (parity group).

Further, the storage apparatus 10 provides the server apparatus 3 with logical storage areas (hereinafter, LUs (Logical Parts, Logical Volumes)) configured by using the LDEVs 172. The storage apparatus 10 manages the correspondence (relation) between LUs and the LDEVs 172. According to this correspondence, the storage apparatus 10 specifies an LDEV 172 corresponding to a LU or specifies a LU corresponding to a LDEV 172.

Figure 5:
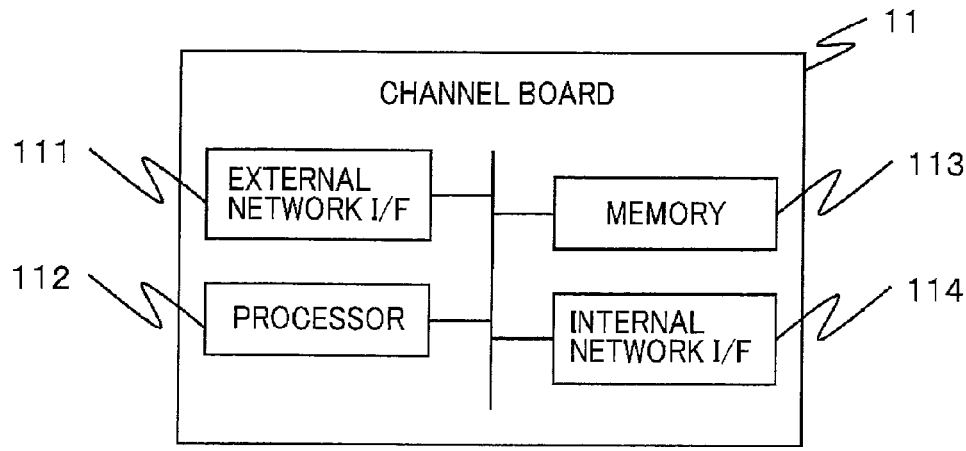
FIG. 5 is an example of hardware of a channel board 11.

FIG. 5 illustrates a hardware configuration of the channel board 11. As illustrated in FIG. 5, the channel board 11 includes an external network interface (hereinafter, external network I/F 111) that includes a port (network port) for communicating with the server apparatus 3, a processor 112 (including a frame processing chip and a frame transfer chip), a memory 113, and an internal network interface (hereinafter, internal network I/F 114) that includes a port (network port) for communicating with the processor board 12.

The external 111 is configured by using an NIC (Network Interface Card), an HBA (Host Bus Adaptor), and the like. The processor 112 is configured by using a CPU (Central Processing Unit), an MPU (Micro Processing Unit), or the like. The memory 113 is a RAM (Random Access Memory) or a ROM (Read Only Memory). The memory 113 stores therein micro programs. Various kinds of functions provided by the channel board 11 are implemented by the processor 112 reading the micro programs from the memory 113 and executing the micro programs. The internal network I/F 114 communicates with the processor board 12, the drive board 13, the cache memory 14, and the shared memory 15 via the internal switch 16.

Figure 6:
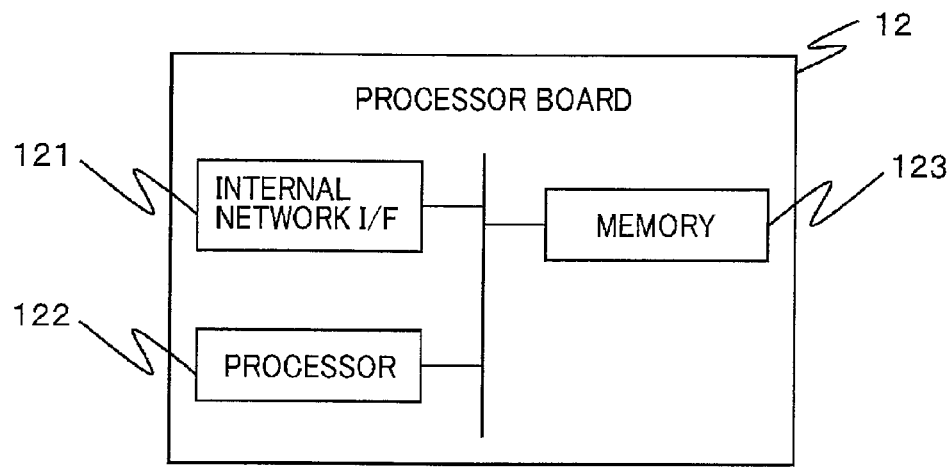
FIG. 6 is an example of hardware of a processor board 12.

FIG. 6 illustrates a hardware configuration of the processor board 12. The processor board 12 includes an internal network interface (hereinafter, internal network I/F 121), a processor 122, and a memory 123 (local memory) that has high access performance (that can be accessed at a high speed) from the processor 122 compared with the shared memory 15. The memory 123 stores therein micro programs. Various kinds of functions provided by the processor board 12 are implemented by the processor 122 reading the micro programs from the memory 123 and executing the micro programs.

The internal network I/F 121 performs communication with the channel board 11, the drive board 13, the cache memory 14, and the shared memory 15 via the internal switch 16. The processor 122 is configured by using a CPU, an MPU, a DMA (Direct Memory Access), and the like. The memory 123 is a RAM or a ROM. The processor 122 can access both the memory 123 and the shared memory 15.

Figure 7:
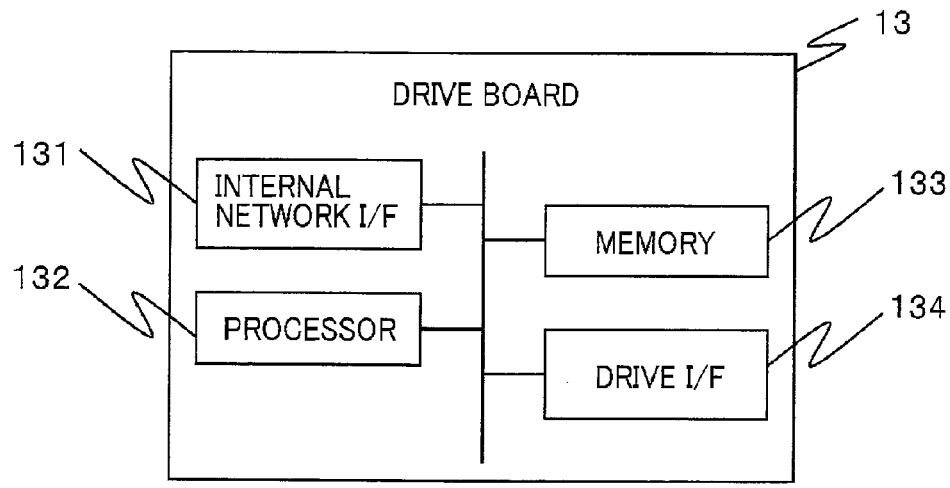
FIG. 7 is an example of hardware of a drive board 13.

FIG. 7 illustrates a hardware configuration of the drive board 13. The drive board 13 includes an internal network interface (hereinafter, internal network I/F 131), a processor 132, a memory 133, and a drive interface (hereinafter, drive I/F 134). The memory 133 stores therein micro programs. Various kinds of functions provided by the drive board 13 are implemented by the processor 132 reading the micro programs from the memory 133 and executing the micro programs. The internal network I/F 131 communicates with the channel board 11, the processor board 12, the cache memory 14, and the shared memory 15 via the internal switch 16. The processor 132 is configured by using a CPU, an MPU, or the like. The memory 133 is for example a RAM or a ROM. The drive I/F 134 communicates with the storage device 17.

The maintenance device 18 illustrated in FIG. 4 controls and monitors statuses of the components of the storage apparatus 10. The maintenance device 18 is a personal computer, an office computer, or the like. The maintenance device 18 communicates as needed with components of the storage apparatus 10 such as the channel board 11, the processor board 12, the drive board 13, the cache memory 14, the shared memory 15, and the internal switch 16 via communication means such as the internal switch 16 or a LAN as needed. Then, the maintenance device 18 acquires operation information and the like from each component and provides a management apparatus 19 with the operation information. Further, on the basis of control information and operation information sent from the management apparatus 19, the maintenance device 18 performs setting, control, and maintenance (including installing and updating of software) on the components.

The management apparatus 19 is a computer that is communicatively coupled with the maintenance device 18 via a LAN or the like. The management apparatus 19 has a user interface using a GUI (Graphical User Interface), a CLI (Command Line Interface) and the like for controlling and monitoring the storage apparatus 10.

Figure 8:
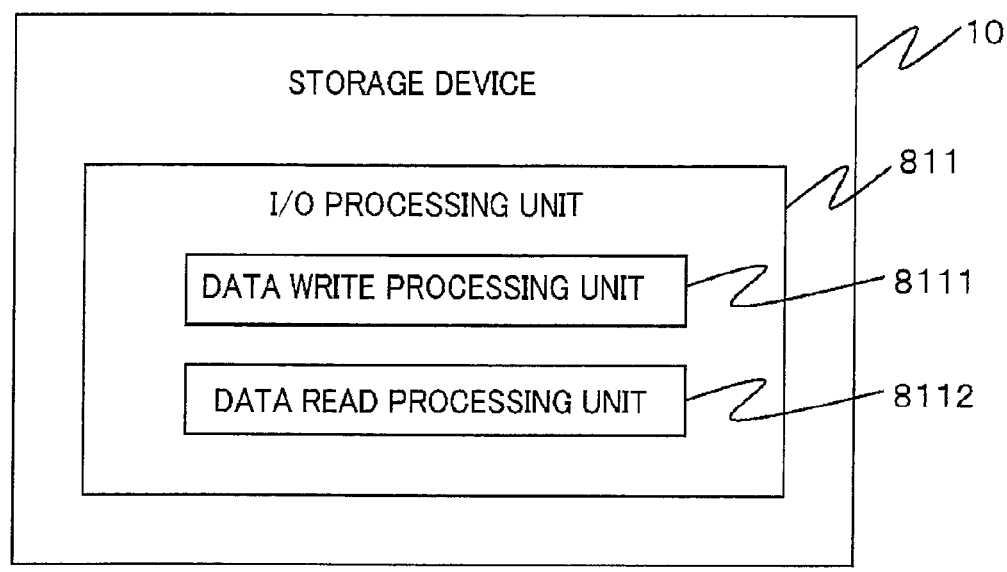
FIG. 8 is a diagram showing basic functions of a storage apparatus 10.

FIG. 8 shows the basic functions of the storage apparatus 10. As shown in FIG. 8, the storage apparatus 10 is provided with an I/O processing unit 811 as a basic function. The I/O processing unit 811 includes a data write processing unit 8111 that performs processing related to writing of data into the storage device 17, and a data read processing unit 8112 that performs processing related to reading of data from the storage device 17. The functions of the I/O processing unit 811 are implemented when the micro programs stored in the memories 113, 123 and 133 are read and executed by hardware of the channel board 11, the processor board 12, and the drive board 13 or the processors 112, 122 and 132 of the storage apparatus 10.

Figure 9:
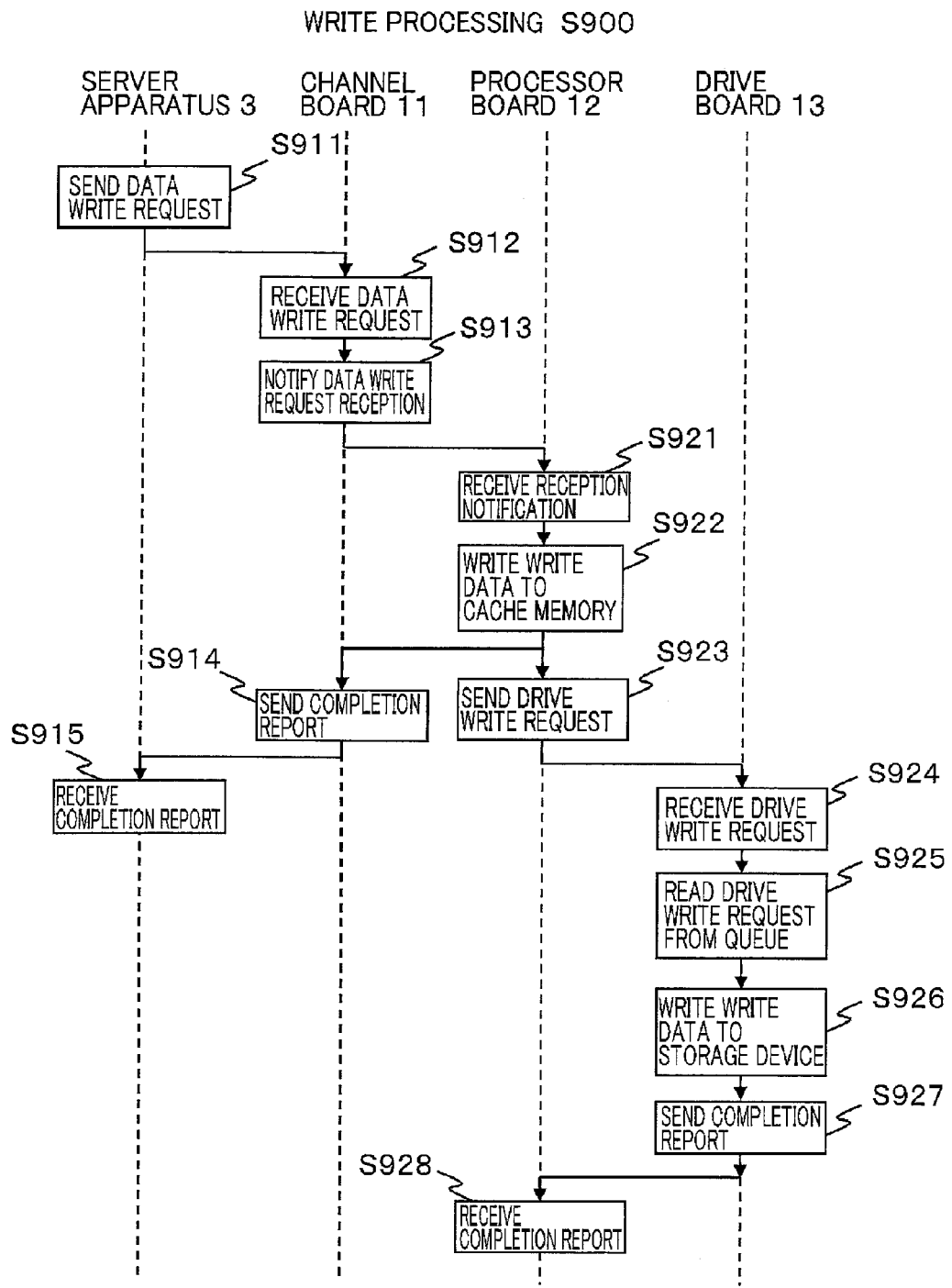
FIG. 9 is a flowchart explaining a write processing S900.

FIG. 9 is a flowchart explaining basic processing (hereinafter, referred to as write processing S900) performed by the data write processing unit 8111 of the I/O processing unit 811 when the storage apparatus 10 (the first storage apparatus 10a or the second storage apparatus 10b, the same applies in the following) receives a frame including a data write request from the server apparatus 3 (the first server apparatus 3a or the second server apparatus 3b). In the following, the write processing 5900 is described in conjunction with FIG. 9. Note that in the following description, the letter "S" prefixed to a numeral indicates Step.

As shown in FIG. 9, first, the frame of the data write request sent from the server apparatus 3 is received by the channel board 11 of the storage apparatus 10 (S911, S912).

The channel board 11, when receiving the frame including the data write request from the server apparatus 3, notifies the processor board 12 of the reception (S913).

The processor board 12, when receiving the above-mentioned notification from the channel board 11 (S921), generates a drive write request based on the data write request of the frame, stores write data in the cache memory 14, and responds to the channel board 11 with the acknowledgement of the above-mentioned notification (S922). The processor board 12 sends the generated drive write request to the drive board 13 (S923).

The channel board 11, when receiving the above-mentioned response from the processor board 12, transmits a completion report to the server apparatus 3 (S914), and the server apparatus 3 receives the completion report from the channel board 11 (S915).

The drive board 13, when receiving the drive write request from the processor board 12, registers the received drive write request to a queue for write processing (S924).

The drive board 13 reads the drive write request from the queue for write processing as needed (S925), reads the write data designated in the read drive write request from the cache memory 14, and writes the read write data in a physical drive 171 (S926). The drive board 13 then notifies the processor board 12 of a report (completion report) indicating that writing of the write data has been completed in response to the drive write request (S927).

The processor board 12 receives the completion report transmitted from the drive board 13 (S928).

Figure 10:
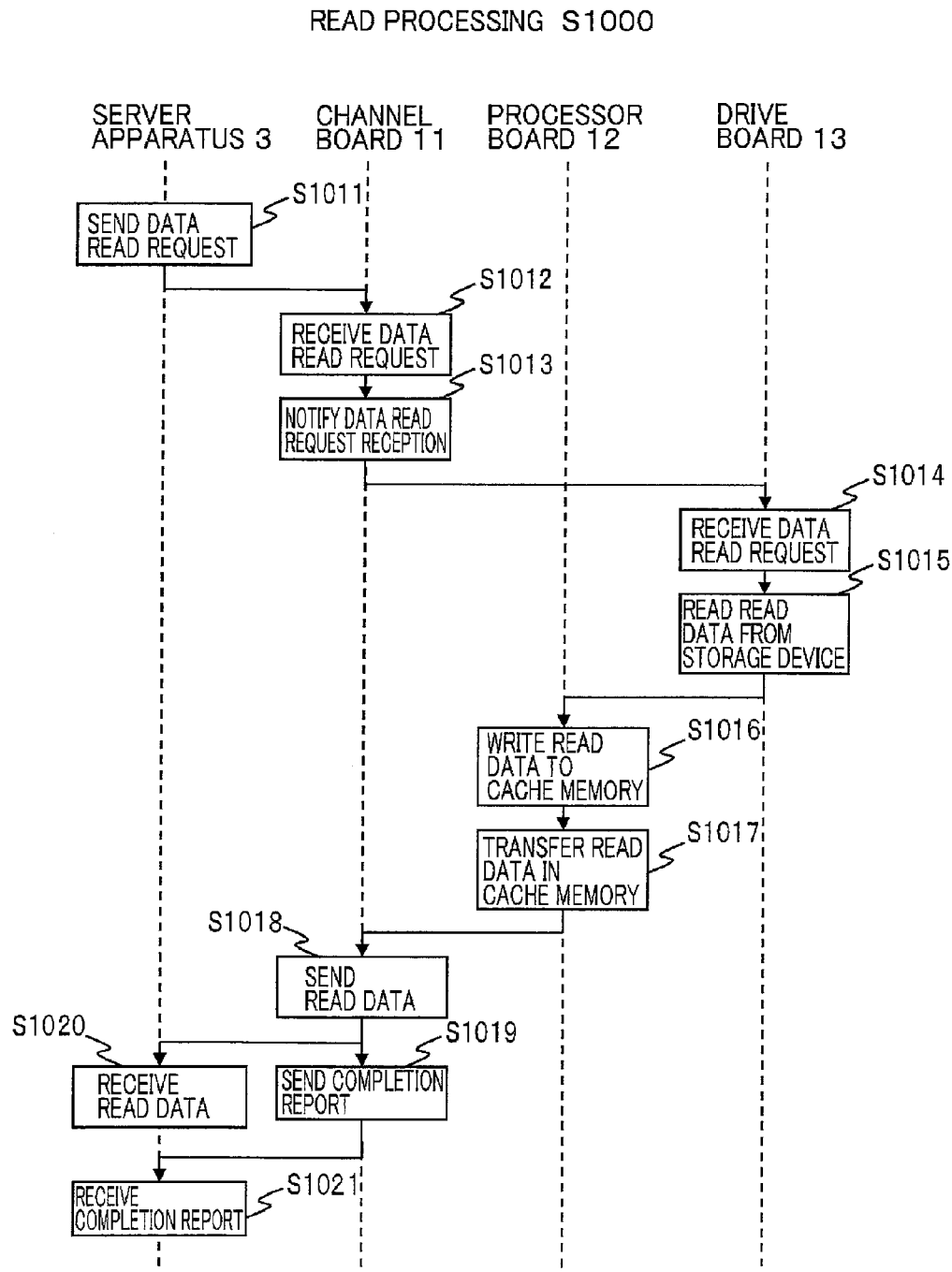
FIG. 10 is a flowchart explaining a read processing S1000.

FIG. 10 is a flowchart illustrating an I/O processing (hereinafter, read processing S1000) that is performed by the data read processing unit 8112 of the I/O processing unit 811 in the storage apparatus 10 when the storage apparatus 10 receives a frame including a data read request from the server apparatus 3. The read processing S1000 is described below with reference to FIG. 10.

As shown in FIG. 10, first, the frame sent from the server apparatus 3 is received by the channel board 11 of the storage apparatus 10 (S1011, S1012).

The channel board 11, when receiving the frame including the data read request from the server apparatus 3, notifies the processor board 12 and the drive board 13 of the reception (S1013).

Upon receiving the notification from the channel board 11 (S1014), the drive board 13 reads data (for example, data specified with an LBA (Logical Block Address)) specified by the data read request in the frame from the storage device 17 (physical drives 171) (S1015). When the read data is present in the cache memory 14 (i.e., in case of a cache hit), the read processing (S1015) from the storage device 17 is omitted.

The processor board 12 writes data read by the drive board 13 into the cache memory 14 (S1016). The processor board 12 transfers the data written into the cache memory 14 to the network UF as needed (S1017).

The channel board 11, when receiving the read data sent as needed from the processor board 12, sends the read data sequentially to the server apparatus 3 (S1018). When the sending of the read data is completed, the channel board 11 sends a completion report to the server apparatus 3 (S1019). The server apparatus 3 receives the read data and the completion report (S1020, S1021).

Figure 11:
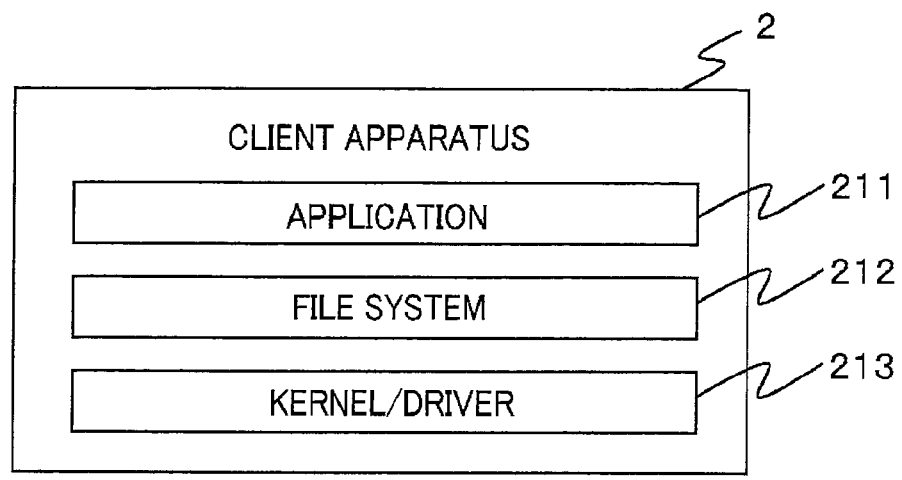
FIG. 11 is a diagram showing the main functions provided by the client apparatus 2.

FIG. 11 is a diagram explaining the main functions provided to the client apparatus 2. As illustrated in FIG. 11, the client apparatus 2 provides functions of an application 211, a file system 212, and a kernel/driver 213. These functions are implemented when programs stored in the memory 22 and the storage device 23 are read and executed by the CPU 21 of the client apparatus 2.

The file system 212 provides the client apparatus 2 with functions related to I/O to and from a logical volume (LU) on a file basis or on a directory basis. The file system 213 is for example an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The kernel/driver 213 is implemented by executing a kernel module and a driver module constituting software of the operating system. The kernel module includes programs for implementing fundamental functions of the operating system, e.g., management of processing, scheduling of processing, management of storage areas, handling of interrupting requests from hardware, and the like, for the software executed in the client apparatus 2. The driver module includes programs and the like with which the kernel module performs communication with hardware constituting the client apparatus 2, and a peripheral device used while being coupled with the client apparatus 2.

Figure 12:
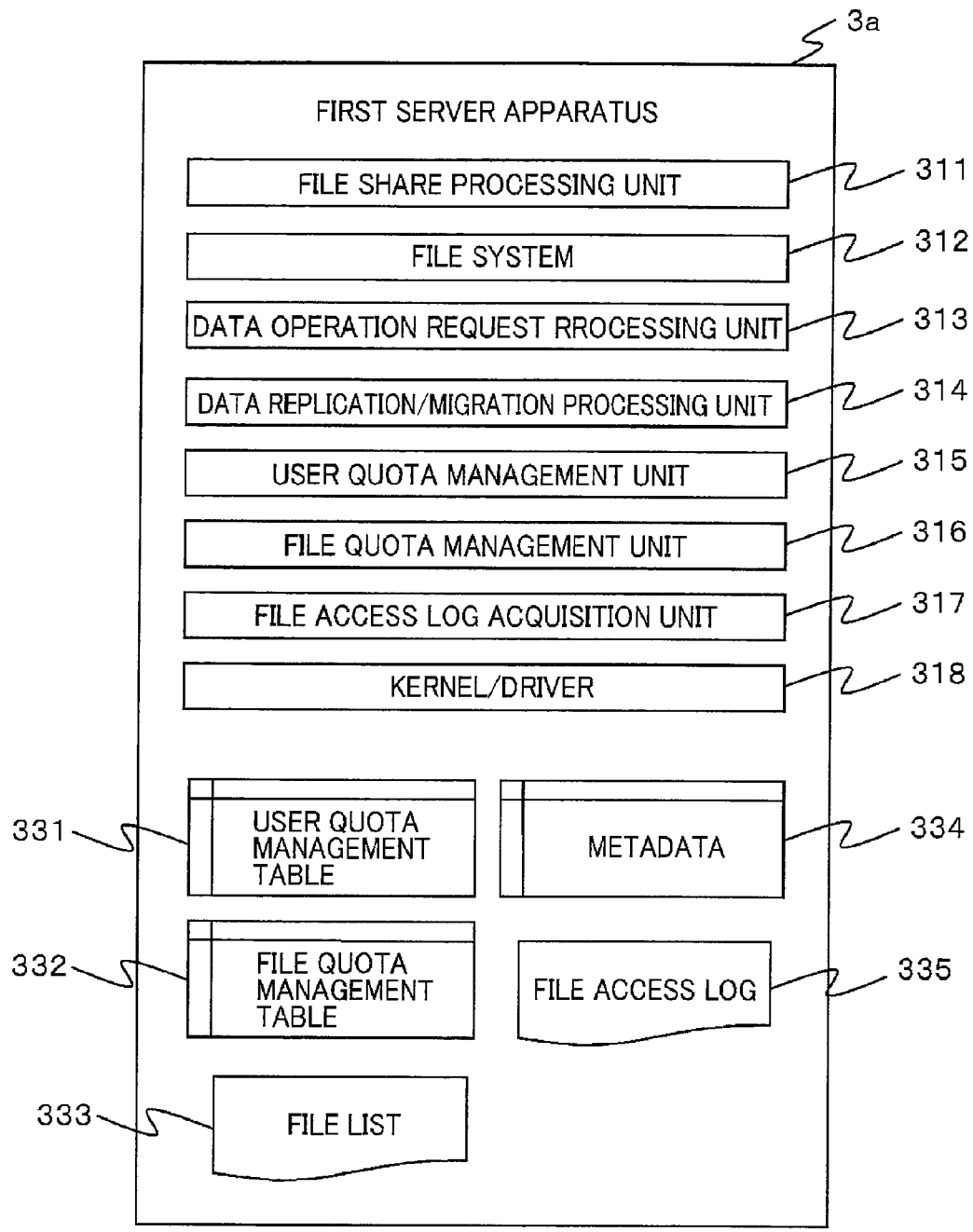

FIG. 12 illustrates primary functions of the server apparatus 3a and primary information (data) managed in the first server apparatus 3a. As shown in the figure, the first server apparatus 3a includes functions of a file share processing unit 311, a file system 312, a data operation request processing unit 313, a data replication/migration processing unit 314, a user quota management unit 315, a file quota management unit 316, a file access log acquisition unit 317, and a kernel/driver 318.

Functions of the data operation request processing unit 313, the data replication/migration processing unit 314, the user quota management unit 315, the file quota management unit 316, and the file access log acquisition unit 317 may be implemented as a function of the file system 312, or may be implemented as a function independent from the file system 312.

As shown in FIG. 12, the first server apparatus 3a manages information (data) such as a user quota management table 331, a file quota management table 332, a file list 333, metadata 334 (the metadata of a file managed by the first storage apparatus 10a or the second storage apparatus 10b), and a file access log 335. The information is stored, for example, in the memory 32 or the storage device 33 of the first server apparatus 3a. Alternatively, the information is read from the first storage 10a to the first server apparatus 3a as needed, and stored in the memory 32 or the storage device 33 of the first server apparatus 3a.

The file share processing unit 311 provides the client apparatus 2 with an environment where files can be shared. The file share processing unit 311 provides the functions specified, for example, in the protocol of NFS (Network File System), CIFS (Common Internet File System), AFS (Andrew File System), and the like.

The file system 312 provides the client apparatus 2, an I/O function to and from the files and directories managed by the logical volume (LU) provided by the first storage apparatus 10a. The file system 312 is for example an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The data operation request processing unit 313 receives a request sent from the client apparatus 2 for data operation request between the first storage apparatus 10a and the second storage apparatus 10b (an operation request on the management scheme by replication and/or the management scheme by migration that are mainly described later, hereinafter, referred to as a data operation request). The data operation request processing unit 313 receives a data operation request generated in the first server apparatus 3a.

The data replication/migration processing unit 314 replicates or migrates data between the first storage apparatus 10a and the second storage apparatus 10b according to the data operation request received by the data operation request processing unit 313.

The user quota management unit 315 manages the information (hereinafter, referred to as a user quota) that specifies the limit of the amount of use of storage resources (the storage area of the first storage apparatus 10a provided to the file system 312 of the first server apparatus 3a) per user (or user group), which is assigned to individual users or individual user groups, and also performs processing related to the above-mentioned limit. The user quota management unit 315 manages the above-mentioned storage resources based on the user quota. In the following, this management scheme is referred to as a user quota management scheme. As an example, there is a user quota management scheme provided to a UNIX (registered trademark) based operating system.

The user quota management unit 315 manages user quotas in the user quota management table 331. FIG. 13 shows an example of the user quota management table 331. As shown in FIG. 13, the user quota management table 331 is configured with one or more records each including items of a user name 3311, a user quota 3312, and a used amount 3313. In these, an identifier (user ID or group ID) that uniquely identifies a user (or user group) of the file system 312 is set in the user name 331. A user quota is set in the user quota 3312. In the present embodiment, the upper limit (the threshold based on the user quota) of the capacity available to the user (or user group) is assumed to be set as a user quota. However, the user quota can be appropriately set, for example, in consideration of a safety factor according to the configuration, the characteristics, the operational conditions of the information processing system 1, user needs of the information processing system 1, or other environments or conditions. Used amount of the current storage resources is set in the used amount 3313.

The file quota management unit 316 shown in FIG. 12 manages the information (hereinafter, referred to as a file quota) that specifies the limit of the storage capacity assigned to each file (or directory (folder)) managed by the file system 312, and also performs processing related to the above-mentioned limit. The file quota management unit 316 manages each file (or directory (folder)) based on the file quota. In the following, this management scheme is referred to as a file quota management scheme. In the following description, the user quota management scheme and the file quota management scheme are collectively referred to as the quota management scheme.

The file quota management unit 316 manages file quotas in the file quota management table 332. FIG. 14 shows an example of the file quota management table 332. As shown in FIG. 14, the file quota management table 332 is configured with records each including items of a filename 3321, a file quota 3322, the number of users 3323, user ID/provided quotas 3324 to 3326, and a used amount 3327.

A path name (a file path name, a directory path name) that is the identifier of a file managed by the file system 312 is set in the filename 3321.

A file quota is set in the file quota 3322. In the present embodiment, the upper limit (the threshold based on the file quota) of the capacity available to the file is assumed to be set as a file quota. However, the file quota can be appropriately set, for example, in consideration of a safety factor according to the configuration, the characteristics, the operational conditions of the information processing system 1, user needs of the information processing system 1, or other environments or conditions.

The number of users who are currently using the file (or directory) is set in the number of users 3323. The number of users is acquired, for example, from the file access log 335.

Information indicating the user ID of the user who provides (supplies) the file quota set in the file quota 3322, and the capacity of the storage resources (quota) that the user supplies are set in the user ID/provided quotas 3324 to 3326. In FIG. 14, three items are provided as the user ID/provided quotas 3324 to 3326; however, the number of these items is changed according to the number of users using the file.

The current capacity (the value on the left side of slash symbol "/") of the file (file size (data size)), and the capacity (the value on the right side of slash symbol "/") of the file when the quota management scheme is changed (described later) are set in the used amount 3327.

When a file stored in a logical volume (LU) of the storage apparatus 10 is accessed (the file is updated (Write, Update), the file is read (Read), the file is opened (Open), the file is closed (Close), and the like), the file access log acquisition unit 317 shown in FIG. 12 stores the information (hereinafter, referred to as an access log) showing the details (history) of the access as the file access log 335 after adding a time stamp to the information, the time stamp being based on the date/time information acquired from the timer 37.

Figures 15, 16:
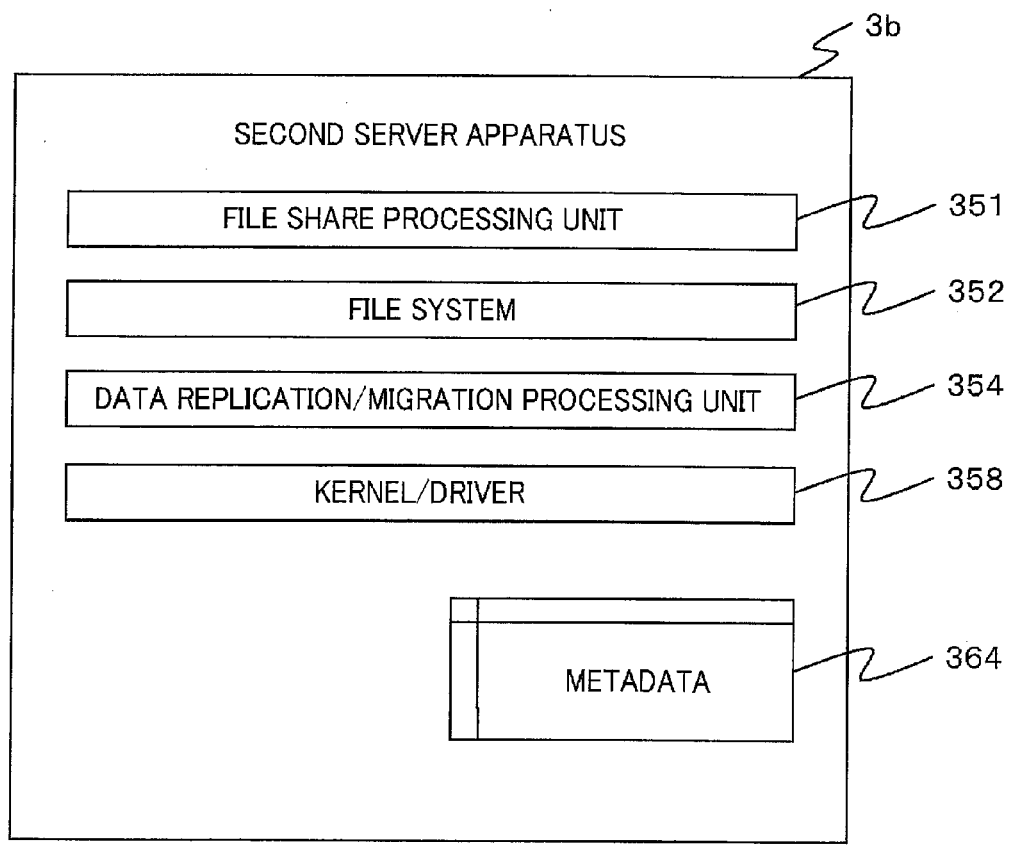
FIG. 15 is an example of a file access log 335.
FIG. 16 is a diagram showing the main functions provided by the second server apparatus 3b, and the main information (data) managed in the second server apparatus 3b.

FIG. 15 shows an example of the file access log 335. As shown in FIG. 15, in the file access log 335 an access log is recorded that is formed of one or more records each including items of an access date 3351, a filename 3352, and a user ID 3353. In these items, the date/time when the file is accessed is set in the access date 3351. The filename of the target file to be accessed is set in the filename 3352. The user ID of the user who accessed the file is set in the user ID 3353.

The kernel/driver 318 illustrated in FIG. 12 is implemented by executing the kernel module and the driver module constituting software of the operating system. The kernel module includes programs for implementing fundamental functions of the operating system, e.g., management of processing, scheduling of processing, management of storage areas, handling of interrupting requests from hardware, and the like, for the software executed by the first server apparatus 3a. Further, the driver module includes programs with which the kernel module communicates with hardware constituting the first server apparatus 3a, and a peripheral device used while being coupled with the first server apparatus 3a.

FIG. 16 shows the main functions provided to the second server apparatus 3b, and the main information (data) managed in the second server apparatus 3b. As shown in FIG. 16, the second server apparatus 3b includes the functions of a file share processing unit 351, a file system 352, a data replication/migration processing unit 354, and a kernel/driver 358. The function of the data replication/migration processing unit 354 may be implemented as a function of the file system 352, or may be implemented independently of the file system 352.

As shown in FIG. 16, the second server apparatus 3b manages metadata 364 (the metadata of the files stored in the first storage apparatus 10a or the second storage apparatus 10b).

The file share processing unit 351 provides the first server apparatus 3a with an environment where files are shared. The file share processing unit 351 is implemented by using, for example, a protocol such as NFS, CIFS, and AFS.

The file system 352 uses a logical volume (LU) provided by the second storage apparatus 10b, and provides I/O function to a logical volume (LU) in units of files or directories for the first server apparatus 3a. The file system is, for example, FAT, NTFS, HFS, ext2, ext3, ext4, UDF, HPFS, JFS, UFS, VTOC, XFS, and the like.

The data replication/migration processing unit 354 replicates or migrates data between the first storage apparatus 10a and the second storage apparatus 10b according to the data operation request as received.

The kernel/driver 358 is implemented by executing the kernel module and the driver module constituting software of the operating system. The kernel module includes programs for implementing fundamental functions of the operating system, e.g., management of processing, scheduling of processing, management of storage areas, handling of interrupting requests from hardware, and the like, for the software executed by the second server apparatus 3b. Further, the driver module includes programs with which the kernel module communicates with hardware constituting the second server apparatus 3b, and a peripheral device used while being coupled with the second server apparatus 3b.

Next, the file system 312 provided to the first server 3a (the detail of the file system 352 provided to the second server 3b is the same) is described in detail.

Figure 17:
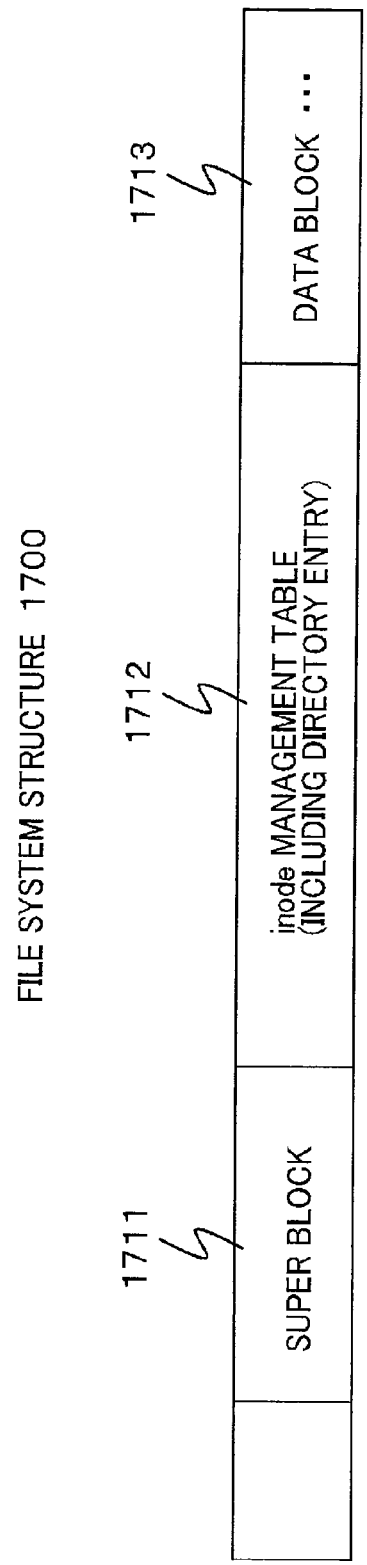
FIG. 17 is a diagram illustrating a file system structure 1700.

FIG. 17 illustrates an exemplary structure of data managed in a logical volume (LU) by the file system 312 (hereinafter, file system structure 1700). As illustrated in FIG. 17, the file system structure 1700 includes storage areas: a super block 1711; an inode management table 1712; and a data block 1713 where entities (data) of files are stored.

In these, the super block 1711 stores therein the information related to the file system (the capacity of the storage area, the used amount, free space, and the like managed by the file system). The super block 1711 is provided in principle per disk partition (partition set on a logical volume (LU)). Specific examples of the above-mentioned information stored in the super block 1711 include the number of data blocks in a partition, a block size, the number of free blocks, the number of free inodes, the mount number of the partition, elapsed time from the most recent consistency check.

Figure 18:
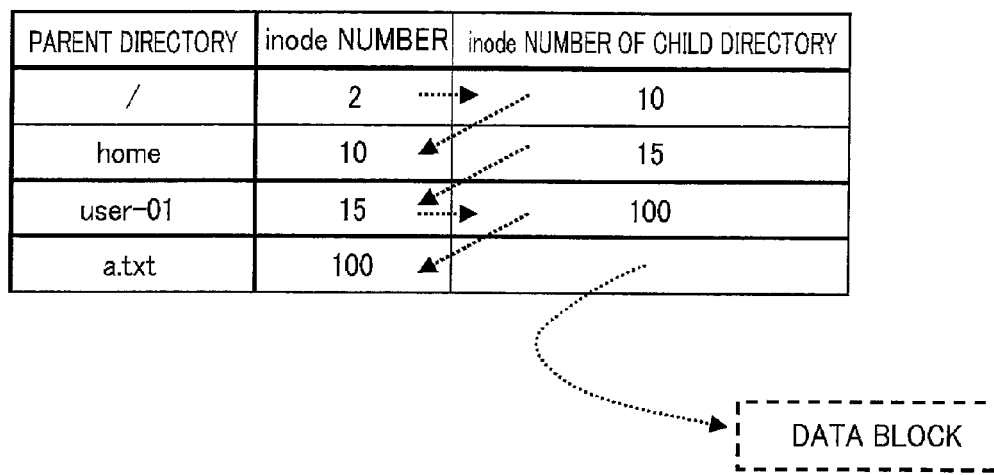
FIG. 18 is a diagram illustrating an inode.

The inode management table 1712 stores therein the management information (hereinafter, referred to as an inode) of the files stored in the logical volume (LU). The file system 312 performs management by associating one file (or directory) with one inode. An inode including only the information related to directory is referred to as a directory entry. At the time of access to a file, the data block of the access target file is accessed with reference to the directory entry. For example, if the file, "/home/user-01/a.txt" is accessed, the data block of the access target file is accessed by sequentially tracing the directory entry in the order of the inode numbers 2->10->15->100 as shown in FIG. 18.

Figure 19:
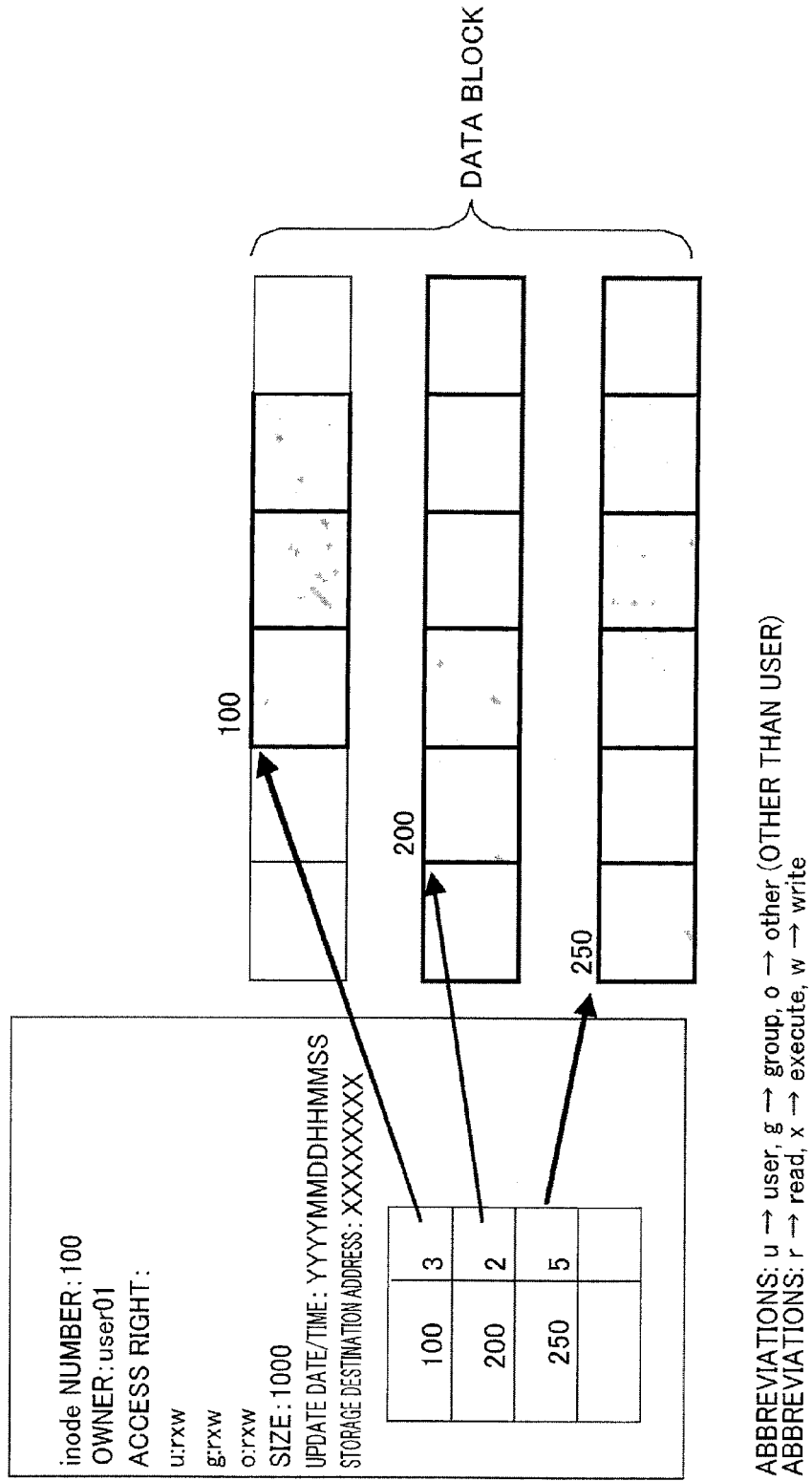
FIG. 19 is a diagram illustrating the concept of the inode.

FIG. 19 shows the concept of an inode in a general file system (for example, the file system provided to a UNIX (registered trademark) based operating system). Also, FIG. 20 shows an example of the inode management table 1712. As shown in FIGS. 19 and 20, an inode includes information such as an inode number 2011 which is an identifier to identify individual inodes, an owner 2012 of the file (or directory), an access right 2013 set for the file (or directory), a file size 2014 of the file (or directory), a last update date/time 2015 of the file (or directory), a parent directory 2016 of the directory, which is set when the inode is a directory entry, a child directory 2017 of the directory, which is set when the inode is a directory entry, and information (hereinafter, referred to as a block address 2018) to identify the data block where the data entity of the file is stored.

As shown in FIG. 21, the file system 312 of the present embodiment manages a stub flag 2111, a metadata synchronization required flag 2112, a data entity synchronization required flag 2113, a replication flag 2114, and a link destination 2115 in the inode management table 1712 in addition to the content of the inode management table 1712 in the above-mentioned general file system.

In FIG. 21, information indicating whether the file corresponding to the inode is stubbed or not is set in the stub flag 2111. Here, stubbed means that when a file is migrated from the first storage apparatus 10a to the second storage apparatus 10b, only the entity of the file data is deleted from the migration source, the first storage apparatus 10a, and the metadata of the file data is not deleted and left in the migration source, the first storage apparatus 10a. Note that the term stub refers to the metadata that is left in the first storage apparatus 10a in that case. The stub flag 2111 is set ON if the file corresponding to the inode is stubbed, and is set OFF if the file is not stubbed.

In the metadata synchronization required flag 2112, information is set that indicates whether synchronization is required to be established (the content are required to be made consistent with each other) or not between the metadata of the file of the first storage apparatus 10a as the replication source and the metadata of the file of the second storage apparatus 10b as the replication destination. The metadata synchronization required flag 2112 is set to ON if synchronization of the metadata is required, and is set to OFF if the synchronization is not required.

In the data entity synchronization required flag 2113, information is set that indicates whether synchronization is required to be established (the content are required to be made consistent with each other) or not between the data entity of the file of the first storage apparatus 10a as the replication source and the data entity of the file of the second storage apparatus 10b as the replication destination. The data entity synchronization required flag 2113 is set to ON if synchronization of the data entity of the file is required, and is set to OFF if the synchronization is not required.

In the replication flag 2114, information is set that indicates whether the file corresponding to the inode is currently a target of management or not by the replication management scheme described later. If the file corresponding to the inode is currently a target of management by the replication management scheme, the replication flag 2114 is set to ON, otherwise the replication flag 2114 is set to OFF.

If the file corresponding to the inode is managed by the replication management scheme described later, information indicating the replication destination of the file (for example, the pathname identifying the storage destination, URL (Uniform Resource Locator), or LU) is set in the link destination 2115. Otherwise, if the file corresponding to the inode is managed by the management scheme by migration described later, the link destination 2115 is set with information indicating the migration destination (for example, the pathname, URL, or LU).

<Functional Description>

In the following, functions performed in the information processing system 1 having the above configuration are described.

Figure 22:
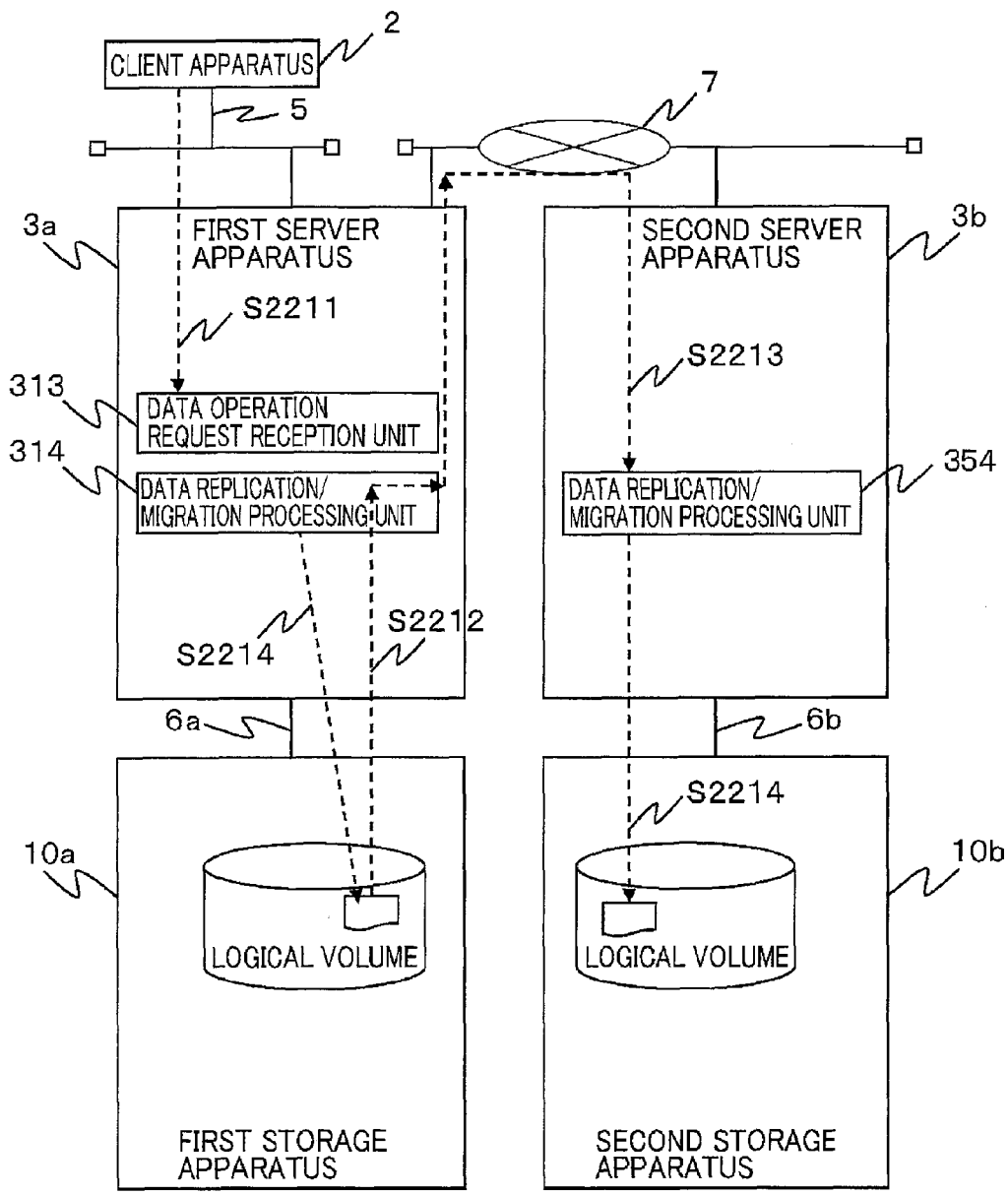
FIG. 22 is a diagram illustrating replication start processing S2200.

FIG. 22 is a diagram illustrating an outline of the processing performed in the information processing system 1 (hereinafter, referred to as replication start processing S2200) when the data operation request processing unit 313 of the first server apparatus 3a receives a request (hereinafter, referred to as a replication start request) indicating that the management scheme by replication is started to be used for the file stored in the first storage apparatus 10a.

Here, the management scheme by replication is a management scheme by which a file (its metadata and entity) is managed in both the first storage apparatus 10a and the second storage apparatus 10b. According to the management scheme by replication, when the entity or metadata of a file in the first storage apparatus 10a is updated, the entity or metadata of the file in the second storage apparatus 10b is updated synchronously or asynchronously.

The data operation request processing unit 313 of the first server apparatus 3a receives the above-mentioned replication execution request from, for example, the client apparatus 2 via the communication network 5. Also, the data operation request processing unit 313 receives the above-mentioned replication execution request, for example, generated inside the first server apparatus 3a (the file share processing unit 311, the file system 312, the kernel/driver 318, etc.).

As shown in FIG. 22, when the data operation request processing unit 313 of the first server apparatus 3a receives the above-mentioned replication execution request (S2211), the data replication/migration processing unit 314 of the first server apparatus 3a reads the data (metadata and entity) of the file designated in the received replication execution request from the first storage apparatus 10a, and transfers the read data of the file to the second server apparatus 10b (S2212).

The data replication/migration processing unit 354 of the second server 3b, when receiving the above-mentioned file data transmitted from the first server apparatus 3a, stores the received data in the second storage apparatus 10b (S2213). At the time of the above-mentioned transfer, the data replication/migration processing unit 314 of the first server apparatus 3a sets the replication flag 2114 of the transfer source file to ON (S2214).

Figure 23:
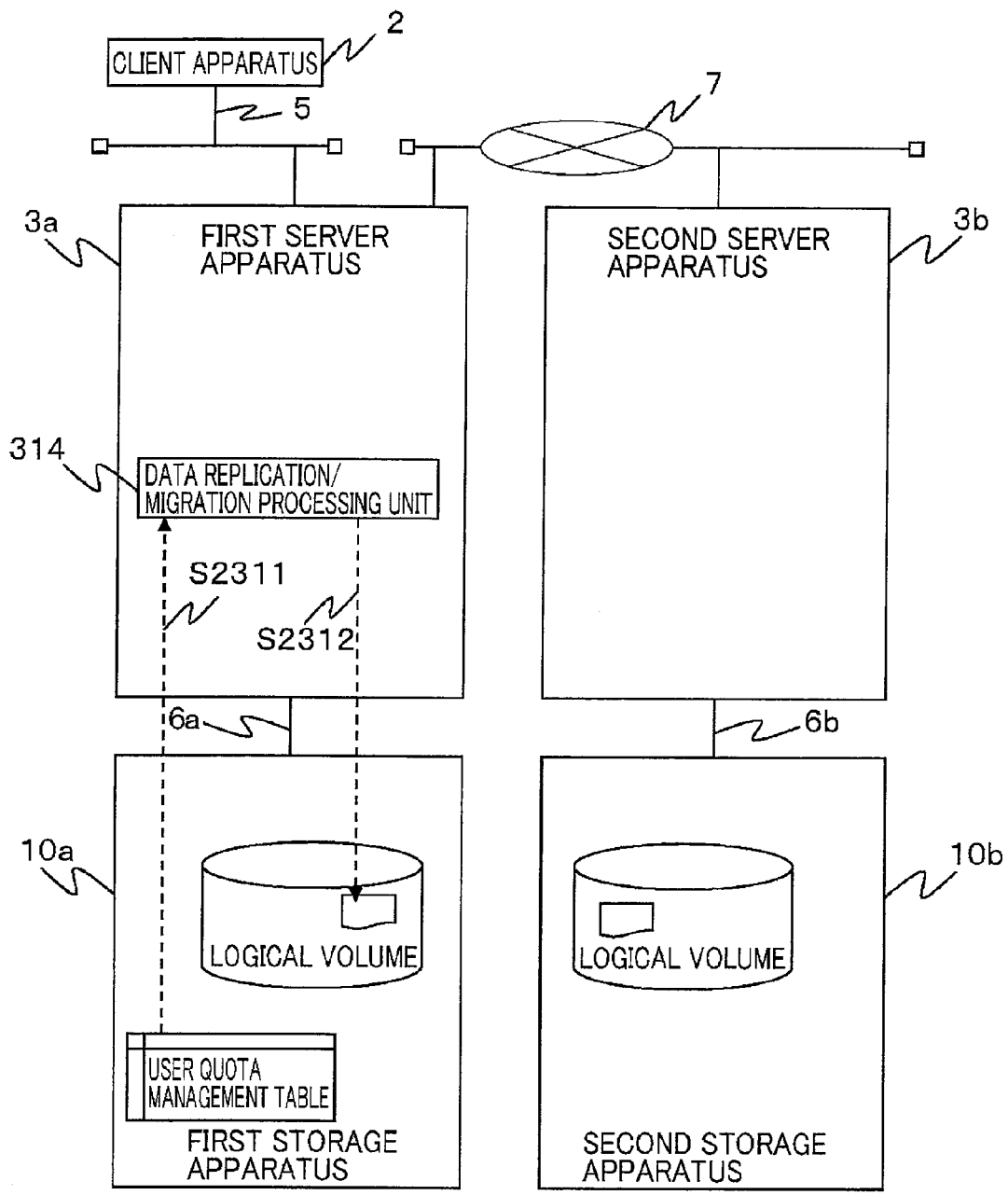
FIG. 23 is a diagram illustrating migration candidate setting processing S2300.

FIG. 23 is a diagram illustrating the processing to set a file as a candidate to be managed by the management scheme by migration (hereinafter, referred to as migration candidate setting processing S2300), the file being stored in the first storage apparatus 10a, and already replicated in the second storage apparatus 10b and thus is managed by the replication management scheme (file for which the replication flag 2114 is set to ON, hereinafter, referred to as a replication file).

Here, the management scheme by migration is a management scheme by which the metadata of the data of a file is managed (stored) in the first storage apparatus 10a, while the entity of the file is not managed (stored) in the first storage apparatus 10a but is managed in the second storage apparatus 10b. If a replication file satisfies a predetermined condition, the first server apparatus 3a sets the file as a target to be managed by the management scheme by migration (even if a file is set as a target to be managed by the migration management scheme, the file is not necessarily immediately started to be managed by the migration management scheme).

As shown in FIG. 23, the data replication/migration processing unit 314 of the first server apparatus 3a monitors the used amount 3313 of each user in the user quota management table 331 (periodically, in real time, etc.) as needed (S2311).

In the monitoring, the data replication/migration processing unit 314, when detecting an existence of a user who has the used amount 3313 exceeding the user quota 3312, sets a part or all of the replication files out of the files owned by the user as a candidate to be managed by the management scheme by migration (S2312). Here, this setting is specifically performed by setting the stub flag 2111 of a target replication file to ON, and setting the replication flag 2114 of the replication file to OFF (S2312).

Figure 24:
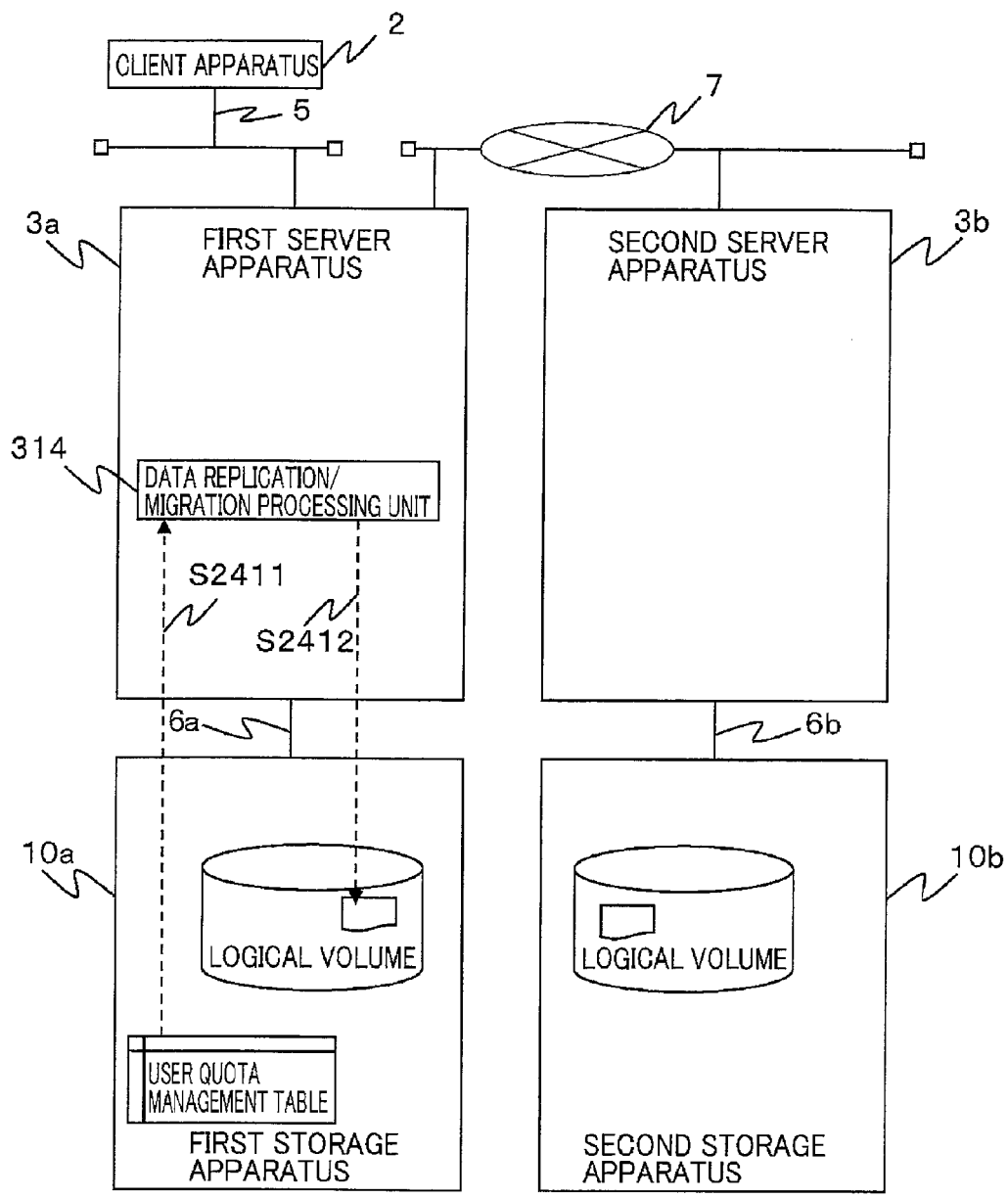
FIG. 24 is a diagram illustrating quota management scheme change processing S2400.

FIG. 24 is a diagram illustrating the processing to change the quota management scheme for the files shared by a plurality of users, out of the replication files stored in the first storage apparatus 10a (hereinafter, referred to as quota management scheme change processing S2400).

The data replication/migration processing unit 314 of the first server apparatus 3a monitors the user quota management table 331 as needed (periodically, in real time, etc.) (S2411). If the conditions that there exists a user who has the used amount 3313 of the user quota management table 331 exceeding the user quota 3312, and the replication file owned by the user is used (shared) by a plurality of users is satisfied, the data replication/migration processing unit 314 starts to manage the replication file by the file quota management scheme (S2412). The replication files that are targets to be managed by the file quota management scheme are excluded from the targets to be managed by the migration management scheme in the user quota management scheme (excluded from the candidates in S2312 of FIG. 23).

Also, when the above-mentioned replication file no longer satisfies the above-mentioned condition, the data replication/migration processing unit 314 terminates the management of the above-mentioned replication file by the file quota management scheme.

Whether a file is used (shared) by a plurality of users or not is determined, for example, based on the content of the file access log 335 (e.g., whether a plurality of users accessed the file between a predetermined past time and the current time), or the access right set to the file (whether an access right allowing a plurality of users to access is set to the file). A replication file excluded from the targets to be managed by the file quota management scheme may become a target to be managed by the migration management scheme in the user quota management scheme again (may become a candidate in S2312 of FIG. 23).

Figure 25:
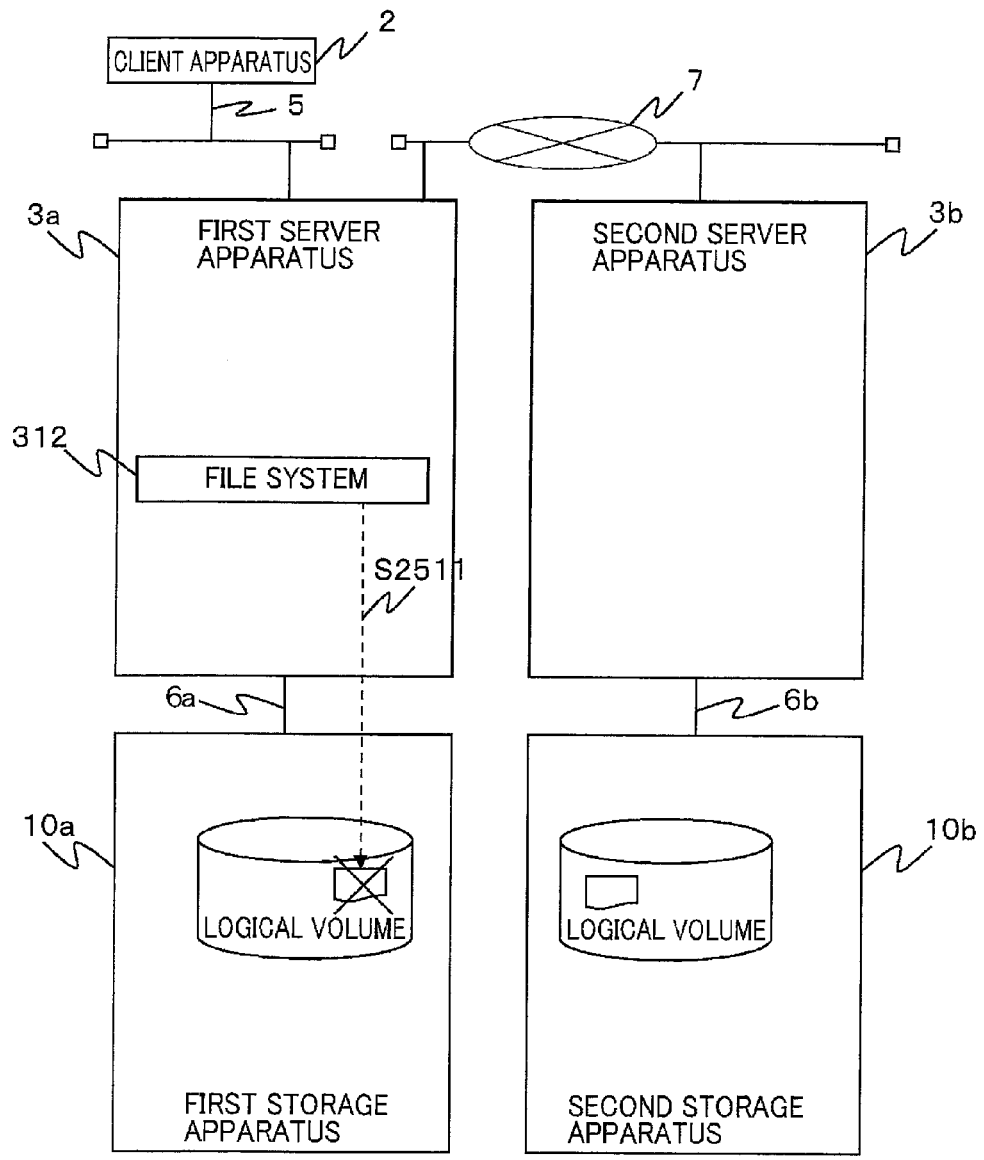
FIG. 25 is a diagram illustrating migration execution processing S2500.

FIG. 25 is a diagram illustrating the processing performed in the information processing system 1 (hereinafter, referred to as migration execution processing S2500) when the entity of a replication file stored in the first storage apparatus 10a is deleted from the first storage apparatus 10a, i.e., when the migration is performed (started).

As shown in FIG. 25, the file system 312 (the data replication/migration processing unit 314 is also applicable) of the first server apparatus 3a determines whether the replication file satisfies a predetermined condition or not as needed (periodically, in real time, etc.). The file system 312, when detecting that the replication file satisfies a predetermined condition, deletes the entity of the replication file from the first storage apparatus 10a (S2511). The metadata of a file already replicated is left as a stub in the first storage apparatus 10a (stubbed).

Here, the above-mentioned predetermined condition includes, for example, the case where the used amount of the replication file exceeds the value of the file quota 3322 managed in the file quota management table 332, and the case where the access to the replication file from e.g., the client apparatus 2 is terminated. In the latter case, whether the access to the replication file is terminated is determined, for example, when the value of the reference counter of the file (the counter that is incremented each time the file is opened, and decremented each time the file is closed) becomes 0.

Figure 26:
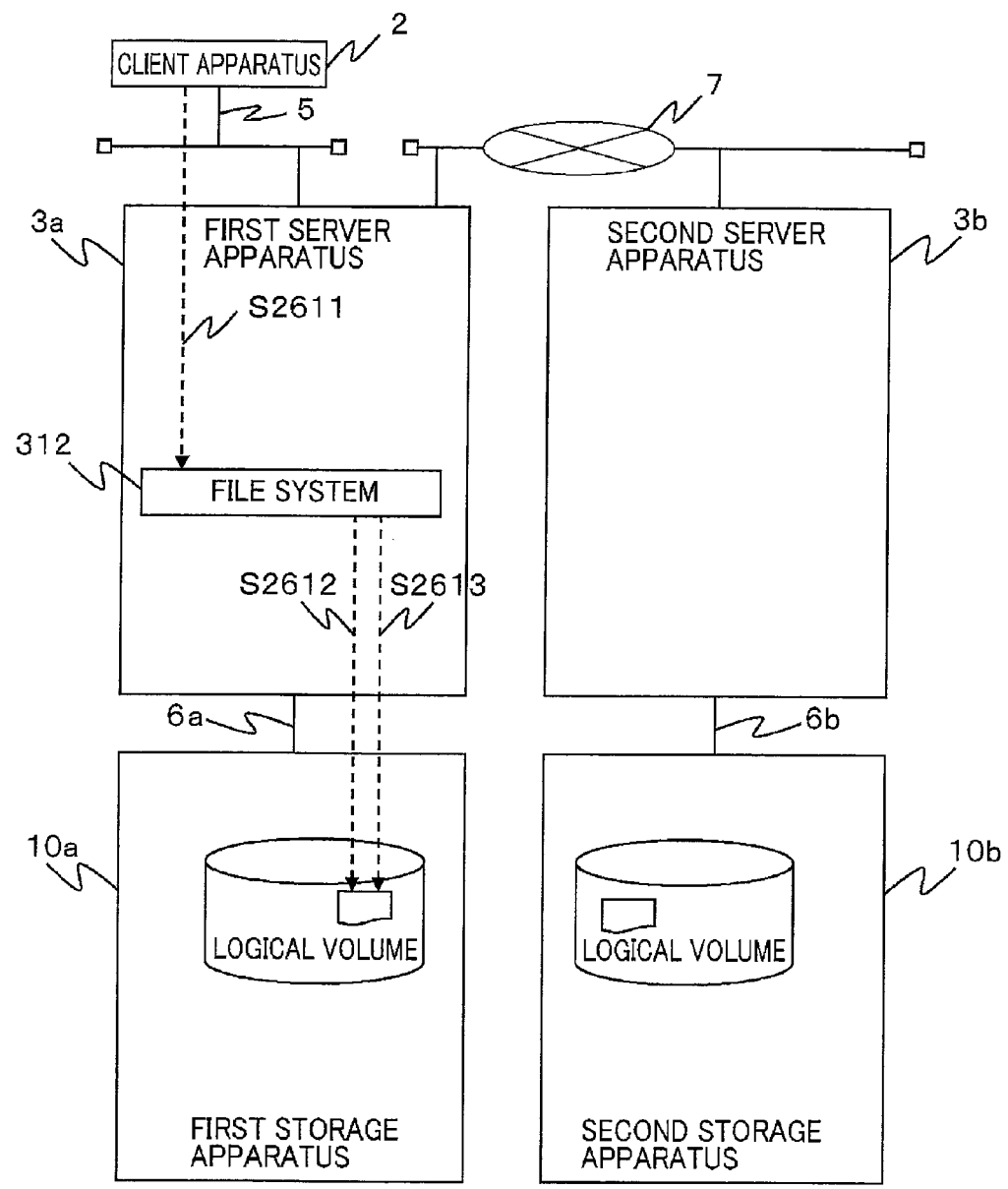
FIG. 26 is a diagram illustrating replication file update processing S2600.

FIG. 26 is a diagram illustrating the processing performed in the information processing system 1 (hereinafter, referred to as replication file update processing S2600) when an update request (request to change the metadata or entity of a file) to a replication file from the client apparatus 2 is received.

The file system 312 of the first server apparatus 3a, when receiving an update request to a replication file from the client apparatus 2 (S2611), updates the metadata of the replication file data, or the entity of the file data according to the update request (S2612). The file system 312, when updating the metadata, sets the metadata synchronization required flag 2112 of the replication file to ON. The file system 312, when updating the entity of the file, sets the data entity synchronization required flag 2113 of the replication file to ON (S2613).

Figure 27:
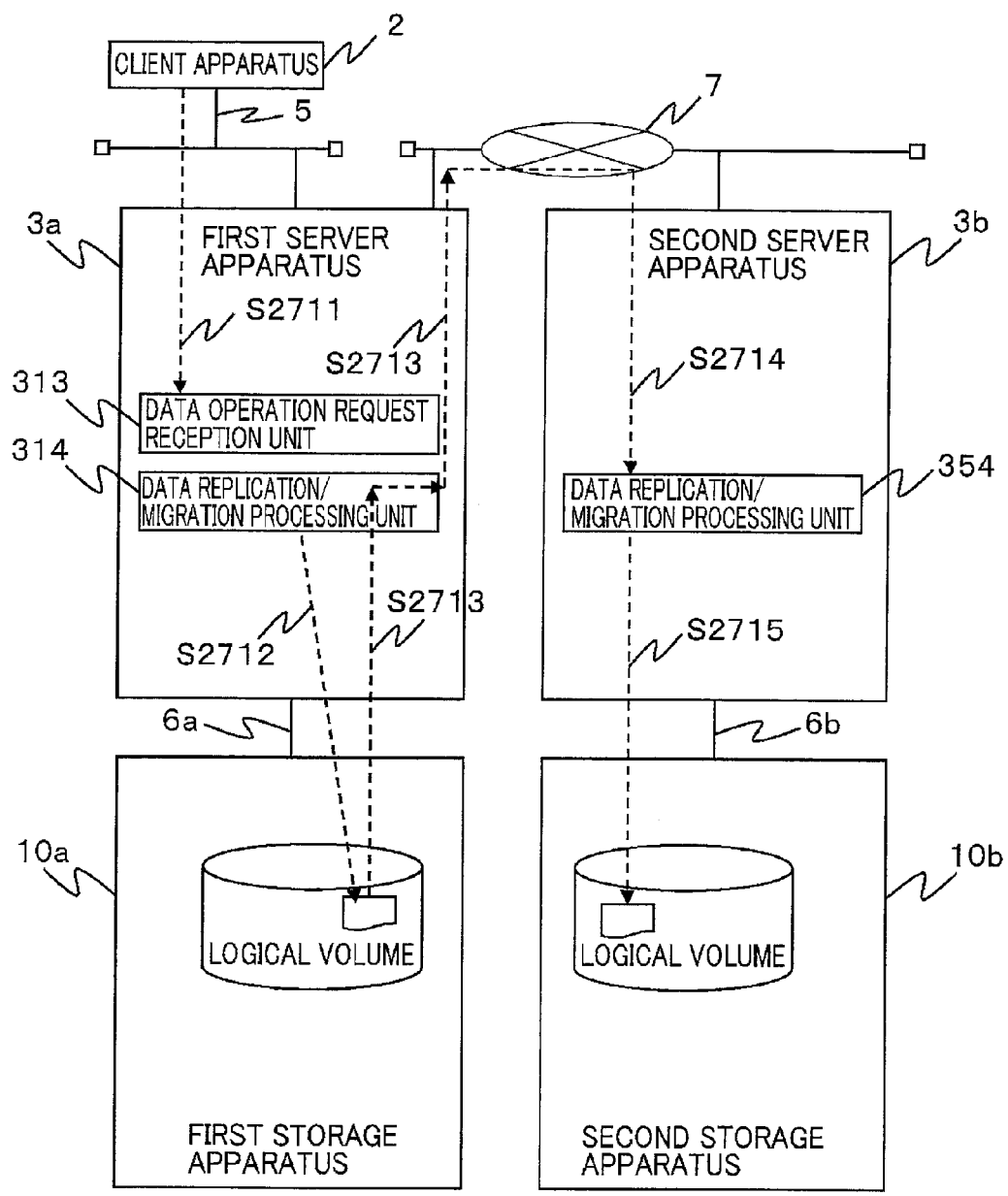
FIG. 27 is a diagram illustrating synchronous processing S2700.

FIG. 27 is a diagram illustrating the processing performed in the information processing system 1 (hereinafter, referred to as synchronization processing S2700) when the data operation request processing unit 313 of the first server apparatus 3a receives a request to synchronize (hereinafter, referred to as a synchronization request) the content of a replication file stored in the first storage apparatus 10a and that of the file in the second storage apparatus 10b (hereinafter, referred to as an archive file). The data operation request processing unit 313 receives the above-mentioned synchronization request from, for example, the client apparatus 2 via the communication network 5. Also, the data operation request processing unit 313 receives the above-mentioned synchronization request, for example, from the inside of the first server apparatus 3a (the file share processing unit 311, the file system 312, the kernel/driver 318, and the like).

As shown in FIG. 27, when the data operation request processing unit 313 of the first server apparatus 3a receives a synchronization request (S2711), the data replication/migration processing unit 314 of the first server apparatus 3a acquires those files for which the metadata synchronization required flag 2112 or the data entity synchronization required flag 2113 is set to ON, from the replication files stored in the first storage apparatus 10a (S2712). The data replication/migration processing unit 314 then transfers the metadata of the acquired file data or the entity of the file data to the second server apparatus 3b, and sets the metadata synchronization required flag 2112 or the data entity synchronization required flag 2113 of the transferred replication file to OFF (S2713). The data replication/migration processing unit 354 of the second server apparatus 3b, when receiving the metadata or entity (S2714), updates the metadata or entity of the archive file stored in the second storage apparatus 10b to the received content of the metadata or entity (S2715).

Figure 28:
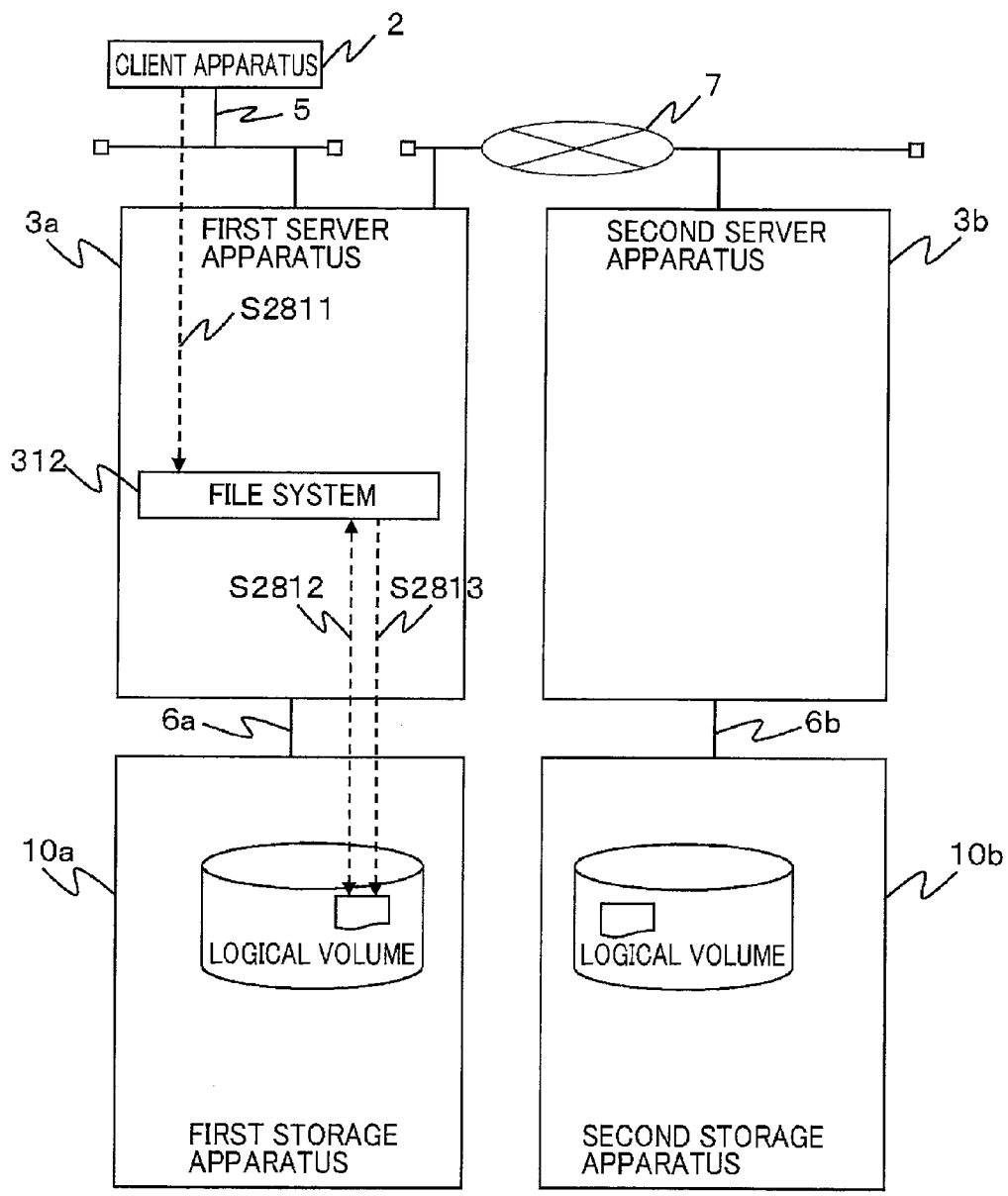
FIG. 28 is a diagram illustrating metadata access processing S2800.

FIG. 28 is a diagram illustrating the processing performed in the information processing system 1 (hereinafter, referred to as metadata access processing S2800) when the file system 312 of the first server apparatus 3a receives an access request (reference request or update request) to the metadata of a file for which the stub flag is set to ON (hereinafter, referred to as a migration file). The file system 312 receives the above-mentioned access request from, for example, the client apparatus 2 via the communication network 5. Also, the file system 312 receives the above-mentioned access request, for example, from the inside of the first server apparatus 3a (the file share processing unit 311, the file system 312, the kernel/driver 318, and the like).

As shown in FIG. 28, the file system 312, when receiving an access to the metadata of a migration file (S2811), acquires the metadata of a migration file of the first storage apparatus 10a, which is the target of the access request, and performs processing (reference, update) according to the content of the access request (S2812). In the case where the content of the metadata is updated, the metadata synchronization required flag 2112 of the migration file is set to ON (S2813).

In this manner, even in the case where an access is requested to a migration file managed in the second storage apparatus 10b, if the access request targets metadata, the first server apparatus 3a responds to the access request by using the metadata stored in the first storage apparatus 10a.

Figure 29:
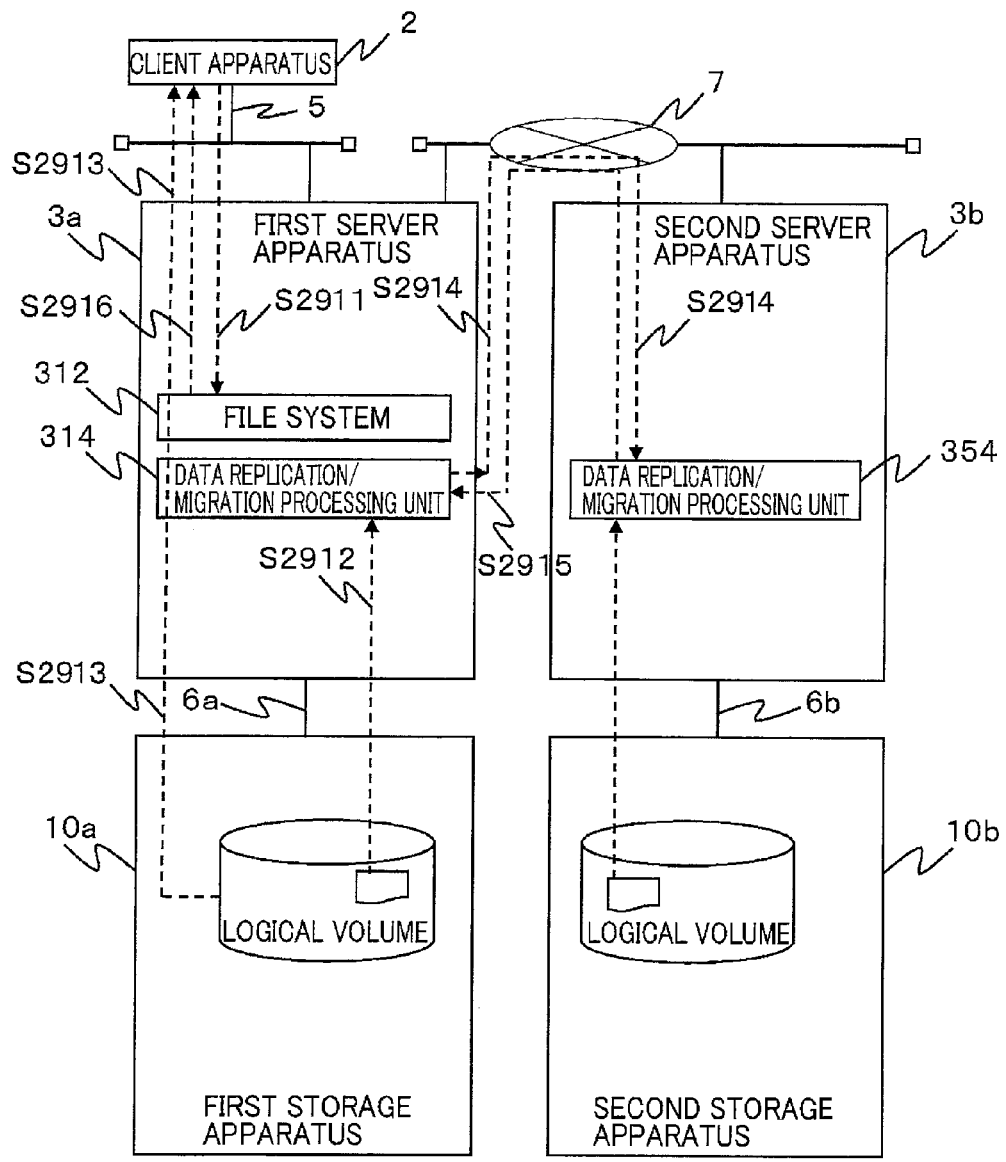
FIG. 29 is a diagram illustrating migration file reference processing S2900.

FIG. 29 is a diagram illustrating the processing performed in the information processing system 1 (hereinafter, referred to as migration file reference processing S2900) when the file system 312 of the first server apparatus 3a receives a reference request for the entity of a migration file from the client apparatus 2.

The file system 312, when receiving a reference request to the entity of a migration file from the client apparatus 2 (S2911), acquires the metadata of the target migration file, and determines whether the entity of the migration file is stored in the first storage apparatus 10a or not based on the acquired metadata (S2912).

The above-mentioned determination is made, for example, by checking whether information indicating the storage destination of the entity (for example, block address) of a migration file is set in a valid state in the acquired metadata. For example, in the case where other preceding update request is addressed, the entity of the migration file is in a state already stored in the first storage apparatus 10a.

When it is determined that the entity of the migration file is stored in the first storage apparatus 10a, the file system 312 reads the entity of the migration file from the first storage apparatus 10a, and responds to the client apparatus 2 with the read content (S2913).

On the other hand, when it is determined that the entity of the migration file is not stored in the first storage apparatus 10a, the file system 312 sends an acquisition request (re-call) for the archive file corresponding to the migration file to the second server apparatus 3b (S2914). Then the file system 312, when receiving the archive file sent from the second server apparatus 3b according to the above-mentioned acquisition request (S2915), responds to the client apparatus 2 with the content of the received archive file (S2916).

The acquisition request of the archive file from the second server apparatus 3b is not necessarily made for acquiring the entire archive file at once. For example, the above-mentioned acquisition request may request a portion of the archive file. In that case, the above-mentioned determination (determination whether the entity is stored in the first storage apparatus 10a or not) may be made for each portion of the entity of the archive file.

Figure 30:
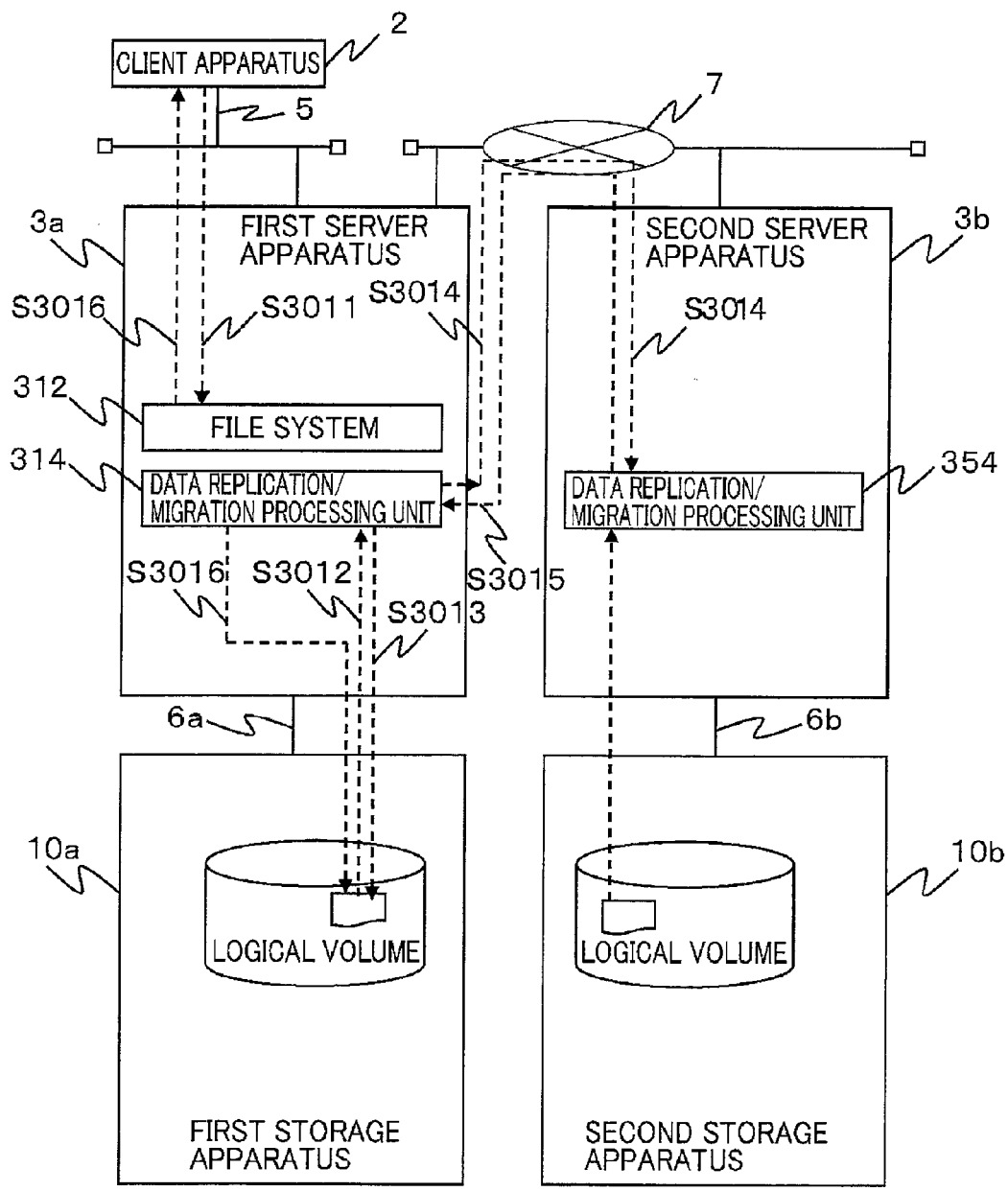
FIG. 30 is a diagram illustrating migration file update processing S3000.

FIG. 30 is a diagram illustrating the processing performed in the information processing system 1 (hereinafter, referred to as migration file update processing S3000) when the file system 312 of the first server apparatus 3a receives an update request for the entity of a migration file from the client apparatus 2.

The file system 312, when receiving an update request for the entity of a migration file (S3011), acquires the metadata of a migration file which is the target of the update request, and determines whether the entity of the migration file is stored in the first storage apparatus 10a or not based on the acquired metadata (S3012). The method of this determination is similar to that in the case for the migration file reference processing S2900.

When it is determined that the entity of the migration file is stored in the first storage apparatus 10a, the file system 312 updates the entity of the migration file stored in the first storage apparatus 10a according to the content of the update request, and sets the data entity synchronization required flag 2113 of the migration file to ON (S3013).

On the other hand, when it is determined that the entity of the migration file is not stored in the first storage apparatus 10a, the file system 312 sends an acquisition request of the archive file corresponding to the migration file to the second server apparatus 3b (S3014), and receives the archive file sent in response thereto from the second server apparatus 3b (S3015). The file system 312 then updates the content of the received archive file according to the content of the update request, and stores the updated archive file in the first storage apparatus 10a as the entity of the migration file (S3016).

Also, the file system 312 sets the stub flag 2111 of the migration file to OFF, sets the replication flag 2114 to ON (that is, returning to the replication management scheme), sets the metadata synchronization required flag 2112 of the migration file to ON, and sets the data entity synchronization required flag 2113 of the migration file to ON. If the migration file is managed by the file quota management scheme, and the amount of migration file space used (file size (data size)) is increased by this update processing, quotas are collected from users for the increased portion.

Next, in the quota management scheme change processing S2400 shown in FIG. 24, setting method for the user quota management table 331 and the file quota management table 332 is described in detail.

FIG. 31 shows an example of the user quota management table 331. As shown in FIG. 31, in the user quota management table 331 the details are set that a quota for the user with the user ID "User01" is 2000 [MB], a quota for the user with the user ID "User02" is 2000 [MB], and a quota for the user with the user ID "User03" is 2000 [MB].

Also, in the user quota management table 331 the details are set that current used amount of the user with the user ID "User01" is 1000 [MB], the current used amount of the user with the user ID "User02" is 1500 [MB], and the current used amount of the user with the user ID "User03" is 1100 [MB]

FIG. 32 is an example of the number of access of each user for the file with the filename (file path name) of "/home/User01/a.txt" achieved based on the file access log 335. As shown in FIG. 32, in the file access log 335 it is recorded that the number of access to the above-mentioned file being made between a predetermined past time and the current time by the user with the user ID of "User01" is 25, by the user with the user ID of "User02" is 35, and by the user with the user ID of "User03" is 40.

Now, if the above-mentioned file (the file with the filename "/home/User01/a.txt") is started to be managed by the file quota management scheme, the file quota management unit 316 of the first server apparatus 3a sets the content of the file quota management table 332 as follows.

First, the file quota management unit 316 assigns a weight to each user based on the content of the file access log 335 as follows:

the weight of User01=25/(25+35+40)=0.25,
the weight of User02=35/(25+35+40)=0.35, and
the weight of User03=40/(25+35+40)=0.40.

Next, the file quota management unit 316 determines the value of quota to be provided by each user in the following manner based on the current file size of the above-mentioned file (here, it is assumed be 100 [MB]), a margin factor (here, it is assumed to be 1.5), and the above-mentioned weights, and generates the file quota management table 332 for the above-mentioned file as shown in FIG. 33 by using the determined values.

The quota value to be provided by the User01=100 [MB] *1.5*0.25=37.5 [MB]

The quota value to be provided by the User02=100 [MB] *1.5*0.35=52.5 [MB]

The quota value to be provided by the User03=100 [MB] *1.5*0.40=60.0 [MB]

The above-mentioned margin factor is any value equal to 1.0 or more, and is set to an appropriate value according to an operational state of the information processing system 1, users' needs, or the like.

In this manner, by collecting a user quota from each user according to the number of accesses thereof to the above-mentioned file, the user quota can be fairly collected from each user. In this example, a quota value to be provided by each user is determined by assigning a weight to each user; however, the current file size (100 [MB]) of the above-mentioned file may be equally provided by the users (for example, if the margin factor is set to 1.5, the quota value of 100 [MB]*1.5/3=50 [MB] is uniformly provided by each user). If the user quota is uniformly collected from each user, the user quota can be equally collected from each user.

When the file quota management table 332 is generated, the user quota management unit 315 of the first server apparatus 3a subtracts the quota value provided (supplied) by each user from the quota value of each user in the user quota management table 331. FIG. 34 shows the content of the user quota management table 331 after the subtraction when the file quota management table 332 of FIG. 33 is generated.

When the file quota management table 332 shown in FIG. 33 is generated, and management by the file quota management scheme is started for the above-mentioned file, and later if the management is terminated, the quota value provided by each user to manage the above-mentioned file by the file quota management scheme is returned to each user. Also, if the file size of the above-mentioned file is increased during the management by the file quota management scheme the increase is distributed among the used amount 3313 of the users in the user quota management table 331 with a predetermined ratio.

For example, as shown in FIG. 35, if the file size of the above-mentioned file is increased by 50 [MB] to reach 150 [MB] during the management by the file quota management scheme, the 50 [MB] is distributed among the used amounts 3313 of the users with a predetermined ratio (for example, the above-mentioned ratio (0.25:0.35:0.40) as shown in FIG. 35, or an equal ratio (0.33:0.33:0.33)).

Instead of performing proportional distribution calculation to distribute the increased portion among the users at the time of termination of the management by the file quota management scheme in this manner, the contribution amount of each user for the above-mentioned increase of the file size may be pre-recorded in the file quota management table 332, and the recorded contribution amount of each user may be reflected to the used amount 3313 of each user at the time of termination of the management by the file quota management scheme. In this manner, the file quota can be fairly provided by each user.

<Processing Description>

Next, the details of the processing performed in the information processing system 1 are described.

Figure 36:
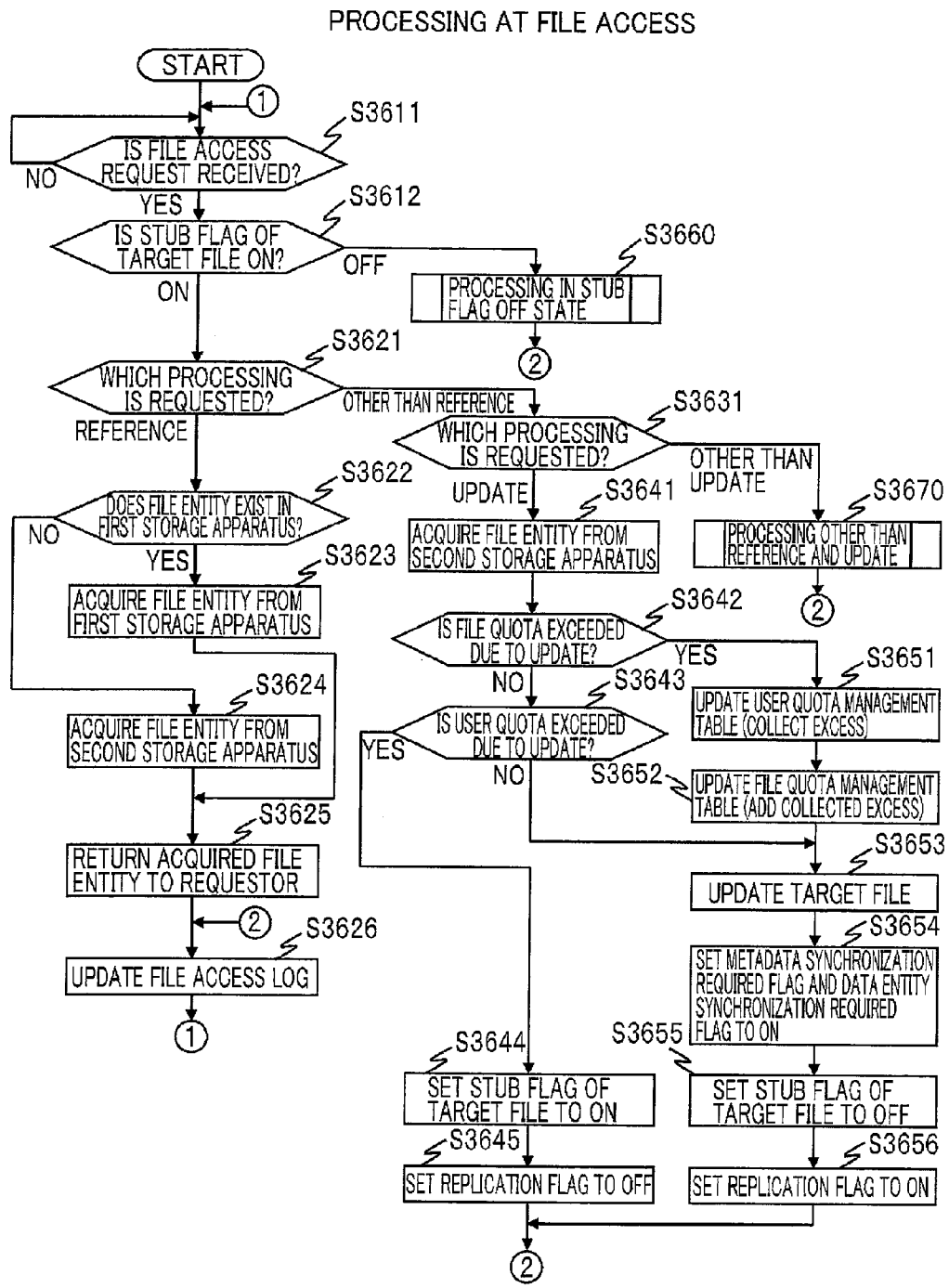
FIG. 36 is a flowchart explaining processing at the time of file access S3600.

FIG. 36 is a flowchart explaining the processing performed (hereinafter, referred to as processing at file access S3600) when the first server apparatus 3a receives an access request to a file from the client apparatus 2. In the following, description is given in conjunction with FIG. 36.

The first server apparatus 3a, when receiving an access request to a file from the client apparatus 2 (S3611), checks the stub flag 2111 of the access target file designated in the access request (hereinafter, referred to as a target file) (S3612).

If the stub flag 2111 is ON (S3612: ON), the processing proceeds to S3621; and if the stub flag 2111 is OFF (S3612: OFF), the processing proceeds to S3660.

In S3621, the first server apparatus 3a checks the processing designated in the received access request. If the designated processing is reference (Read) of a file (S3621: reference), the processing proceeds to S3622; and if the designated processing is processing other than reference of a file (S3621: other than reference), the processing proceeds to S3631.

In S3622, the first server apparatus 3a determines whether or not the entity of the target file exists in the first storage apparatus 10a. Whether the entity of the target file exists or not is determined, for example, based on whether or not a valid storage destination of the first storage apparatus 10a (an identifier or a block address of logical volume) is set to the metadata of the target file. If the entity of the target file exists in the first storage apparatus 10a (S3622: YES), the processing proceeds to S3623, otherwise the processing proceeds to S3624 (S3622: NO).

In S3623, the first server apparatus 3a acquires the entity of the target file from the first storage apparatus 10a. Subsequently, the processing proceeds to S3625. In S3624, the first server apparatus 3a acquires the entity of the file from the second storage apparatus 10b. Subsequently, the processing proceeds to S3625. In S3625, the first server apparatus 3a returns the entity of the acquired file to the requestor.

In S3626, the first server apparatus 3a records the history of the above processing in the file access log 335, the processing being performed for the target file related to the reference. Subsequently, the processing returns to S3611, and the first server apparatus 3a is again on standby for an access request sent from the client apparatus 2.

In S3631, the first server apparatus 3a checks the processing designated in the access request. If the designated processing is update (Write) of a file (S3631: update), the processing proceeds to S3641; and if the designated processing is processing other than updating of a file (S3631: other than update), the processing proceeds to S3670.

In S3641, the first server apparatus 3a acquires the entity of the file from the second storage apparatus 10b.

Subsequently, the first server apparatus 3a determines whether or not the capacity (file size) of the target file exceeds the file quota 3322 by referring to the file quota management table 332 to update the target file according to the access request (S3642). If the capacity of the target file exceeds the file quota 3322 (S3642: YES), the processing proceeds to S3651, otherwise (S3642: NO), the processing proceeds to S3643.

In S3643, the first server apparatus 3a determines whether or not the used amount 3313 of the storage resources of the owner (user) of the target file exceeds the user quota 3312 of the user by referring to the user quota management table 331 and updating the target file according to the access request. If the used amount 3313 of the storage resources of the user exceeds the user quota 3312 of the user (S3643: YES), the processing proceeds to S3644, otherwise (S3643: NO), the processing proceeds to S3653.

In S3644, the first server apparatus 3a sets the stub flag 2111 of the target file to ON, and sets the target file as a candidate to be managed by the migration management scheme. Accordingly, the first server apparatus 3a sets the replication flag 2114 of the target file to OFF (S3645). Subsequently, the processing proceeds to S3626.

On the other hand, in S3651, the first server apparatus 3a collects (subtracts) an exceeded portion of the file quota due to the update (=file size of the target file after the update−the file quota of the target file) from the user quota of the user, and updates the value of the user quota 3312 of the user in the user quota management table 3313 to the value after the collection. Also, the first server apparatus 3a adds the collected user quota to the file quota of the target file, and updates the value of the file quota 3322 of the file quota management table 332 to the value after the addition (S3652).

In this manner, when the capacity of the file exceeds the file quota due to the update of the file, a user quota is collected from the user using the file and added to the file quota as needed, thus frequent exclusion of the file from the management by file quota due to the update can be prevented.

Subsequently, the first server apparatus 3a actually updates the entity of the target file according to the access request (S3653), and sets both the metadata synchronization required flag 2112 and the data entity synchronization required flag 2113 of the target file to ON (S3654). At this point, the first server apparatus 3a sets the stub flag 2111 of the target file to OFF (S3655), and sets the replication flag 2114 of the target file to ON (S3656). Subsequently, the processing proceeds to S3626.

Figure 37:
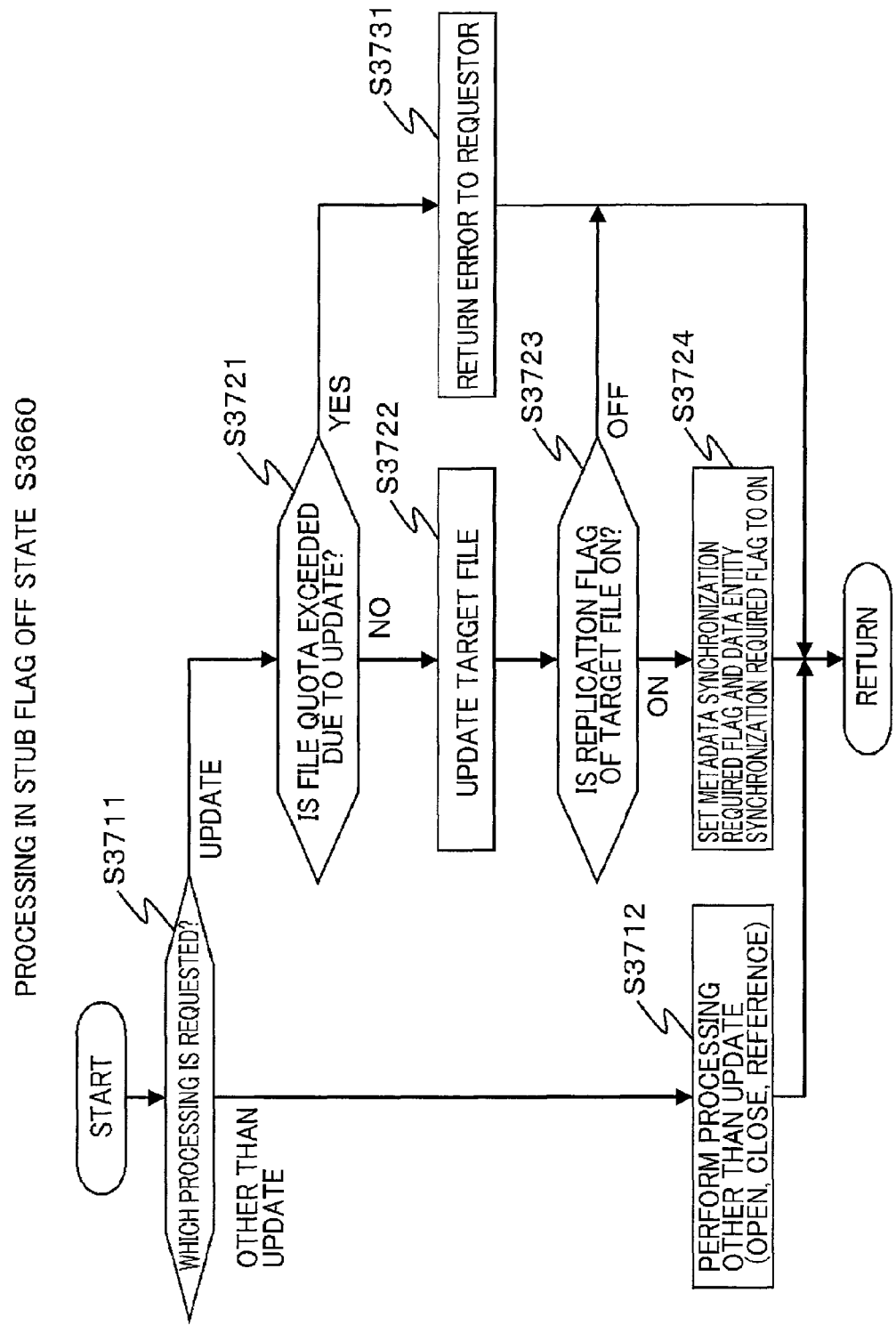
FIG. 37 is a flowchart explaining processing in stub flag OFF state S3660.

FIG. 37 is a flowchart explaining the processing in S3660 of FIG. 36 (hereinafter, referred to as processing in flag OFF state S3660). In the following, description is given in conjunction with the figure.

First, the first server apparatus 3a checks the processing designated in the access request (S3711). If the designated processing is updating (Write) of a file (S3711: update), the processing proceeds to S3721; and if the designated processing is processing other than updating of a file (S3711: other than update), the processing proceeds to S3712.

In S3712, the first server apparatus 3a performs processing other than updating of the target file (for example, reference processing of the target file, file opening of the target file, file closing of the target file). Subsequently, the processing returns to S3626 of FIG. 36.

In S3721, the first server apparatus 3a determines whether or not the used amount 3313 of the owner (user) of the target file exceeds the user quota 3312 of the user by referring to the user quota management table 331 and updating the target file according to the access request. If the used amount 3313 of the user exceeds the user quota 3312 of the user (S3721: YES), an error (error indicating that a quota is exceeded) is returned to the client apparatus 2 as the requestor (S3731), and subsequently, the processing returns to S3626 of FIG. 36.

On the other hand, if the used amount 3313 of the owner (user) of the target file does not exceed the user quota 3312 of the user (S3721: NO), the processing proceeds to S3722.

In S3722, the first server apparatus 3a actually updates the entity of the target file according to the access request. If the replication flag 2114 of the target file is set to ON (S2723: ON), the first server apparatus 3a sets both the metadata synchronization required flag 2112 and the data entity synchronization required flag 2113 of the target file to ON (S3724). Subsequently, the processing returns to S3626 of FIG. 36.

Figure 38:
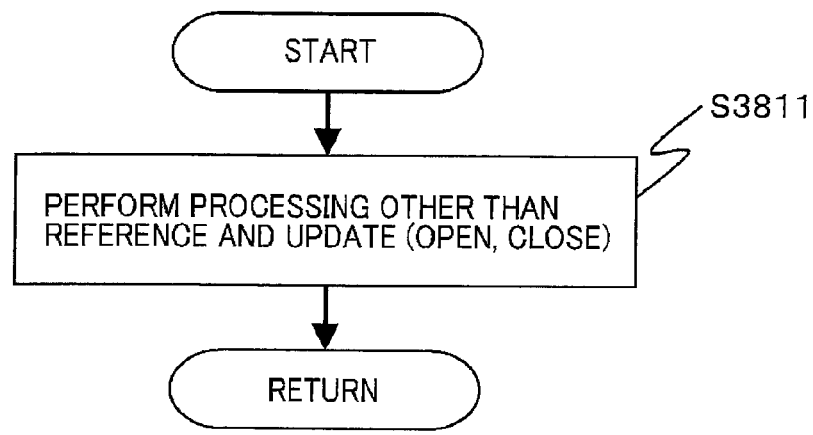
FIG. 38 is a flowchart explaining processing other than referencing and updating S3670.

FIG. 38 is a flowchart explaining the processing in S3670 of FIG. 36.

In the processing other than referencing and updating S3670, the first server apparatus 3a performs processing other than updating of the target file (for example, opening or closing of the target file) (S3811). Subsequently, the processing returns to S3626 of FIG. 36.

Figure 39:
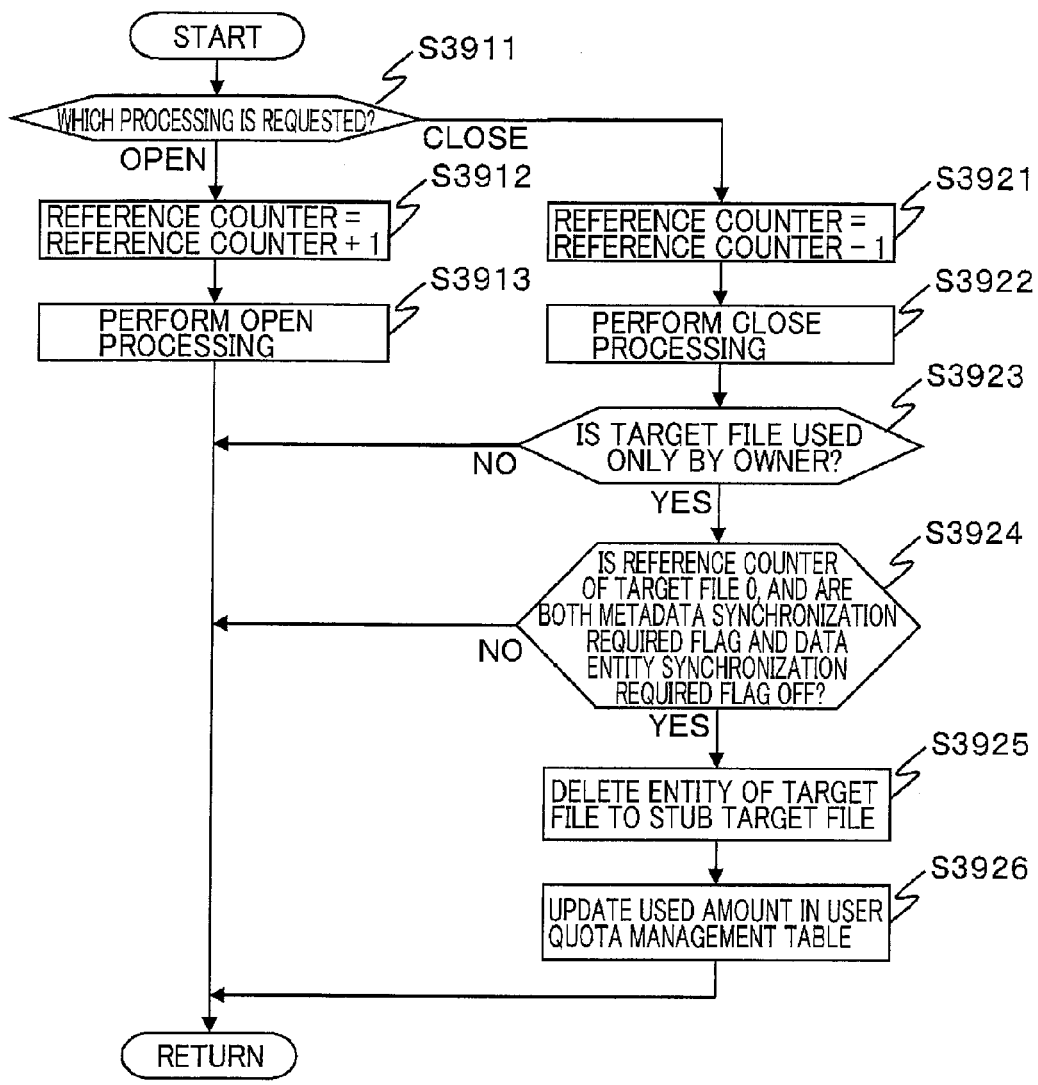
FIG. 39 is a flowchart explaining processing other than referencing and updating S3900.

FIG. 39 is a flowchart explaining other aspects of the processing in S3670 of FIG. 36 (hereinafter, referred to as processing other than referencing and updating S3900). This aspect is different from the case of FIG. 38 in that the entity of the target file is deleted from the first storage apparatus 10a to stub the target file at timing when the value of the reference counter, which is incremented when the target file is opened, and decremented when the target file is closed, becomes 0.

As shown in FIG. 39, first, the first server apparatus 3a checks the processing designated in the access request (S3911). If the designated processing is opening of a file (S3911: OPEN), the processing proceeds to S3912; and if the designated processing is closing of a file (S3911: CLOSE), the processing proceeds to S3921.

In S3912, the first server apparatus 3a increments (adds one to) the reference counter of the target file, and opens the target file (S3913). Subsequently, the processing returns to S3626 of FIG. 36.

In S3921, the first server apparatus 3a decrements (subtracts one from) the reference counter of the target file, and closes the target file (S3922).

Subsequently, the first server apparatus 3a determines whether or not the target file is used only by the owner of the target file (S3923). If the target file is not used only by the owner of the target file (S3923: NO), the processing returns to S3626 of FIG. 36. If the target file is used only by the owner of the target file (S3923: YES), the processing proceeds to S3924.

In S3924, the first server apparatus 3a determines whether or not the value of the reference counter of the target file is 0, and both the metadata synchronization required flag 2112 and the data entity synchronization required flag 2113 of the target file are OFF. If the above-mentioned conditions are not satisfied (S3924: NO), the processing returns to S3626 of FIG. 36. If the above-mentioned condition is satisfied (S3924: YES), the processing proceeds to S3925.

In S3925, the first server apparatus 3a deletes the entity of the target file from first storage apparatus 10a to stub the target file. Accordingly, the first server apparatus 3a updates the used amount 3313 of the owner of the target file in the user quota management table 331 to the value after stubbing (S3926). Subsequently, the processing returns to S3626 of FIG. 36.

In this manner, migration can be performed properly and safely by starting the migration at the timing when the reference counter of the file becomes 0 and synchronization of the metadata and the entity is not required.

Figure 40:
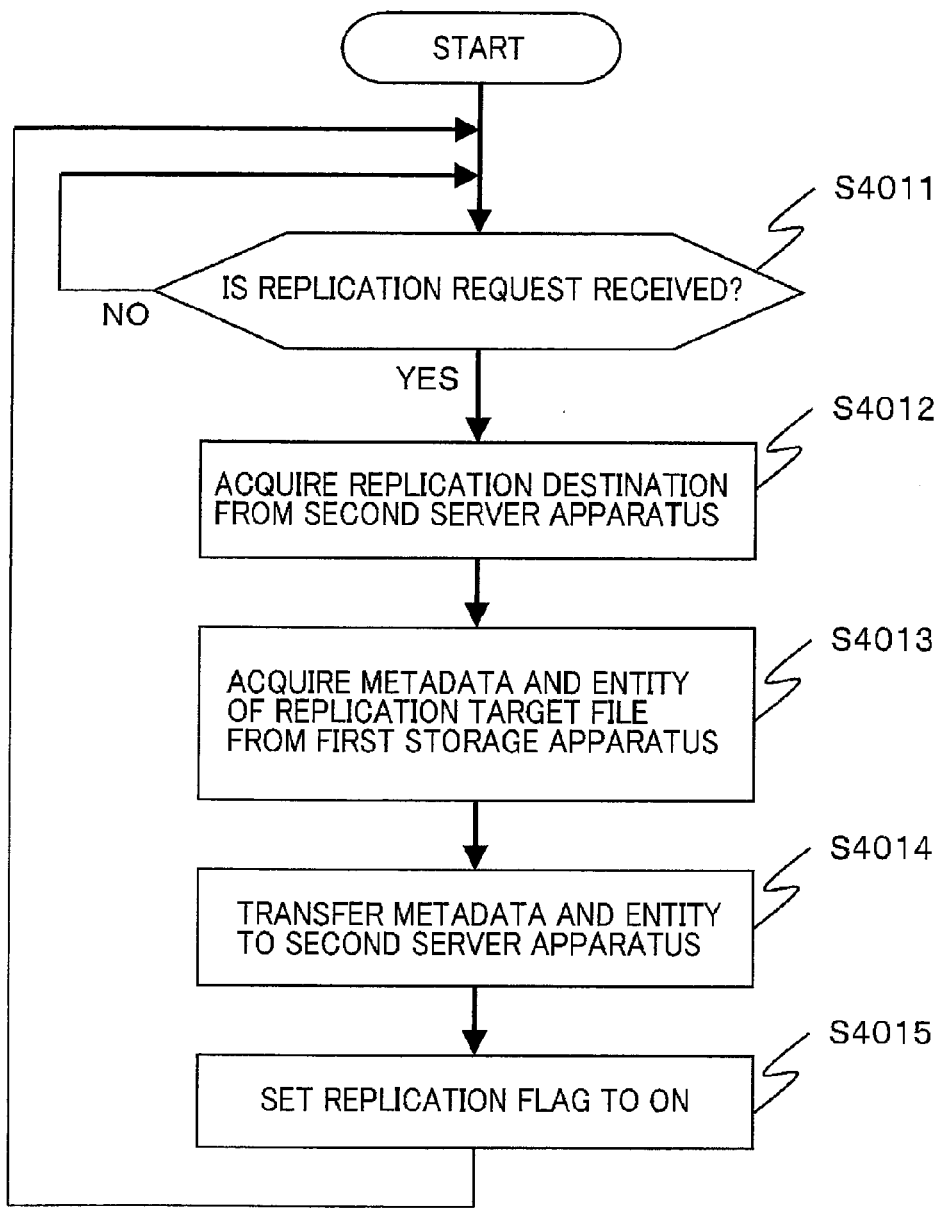
FIG. 40 is a flowchart explaining replication processing S4000.

FIG. 40 is a flowchart explaining the processing performed by the first server apparatus 3a (hereinafter, referred to as replication processing S4000) when the first server apparatus 3a receives a request for switching to the replication management scheme for a file stored in the first storage apparatus 10a (hereinafter, referred to as a replication request).

The first server apparatus 3a, when receiving a replication request (S4011: YES), acquires the replication destination (the storage location for replicated file) for the file designated in the replication request (hereinafter, referred to as a replication target file) from the second server apparatus 3b (S4012). The first server apparatus 3a receives the above-mentioned replication request, for example, from the client apparatus 2. Also, the first server apparatus 3a receives the above-mentioned replication request, for example, from the inside of the first server apparatus 3a (the file share processing unit 311, the file system 312, the kernel/driver 318, and the like).

Next, the first server apparatus 3a acquires the metadata and entity of the replication target file from the first storage apparatus 10a (S4013), then transfers the replica of the acquired metadata and entity to the second server apparatus 3b (S4014), and sets the replication flag 2114 of the replication target file to ON (S4015). Subsequently, the processing returns to S4011, and the first server apparatus 3a is again on standby for the next replication request.

Figure 41:
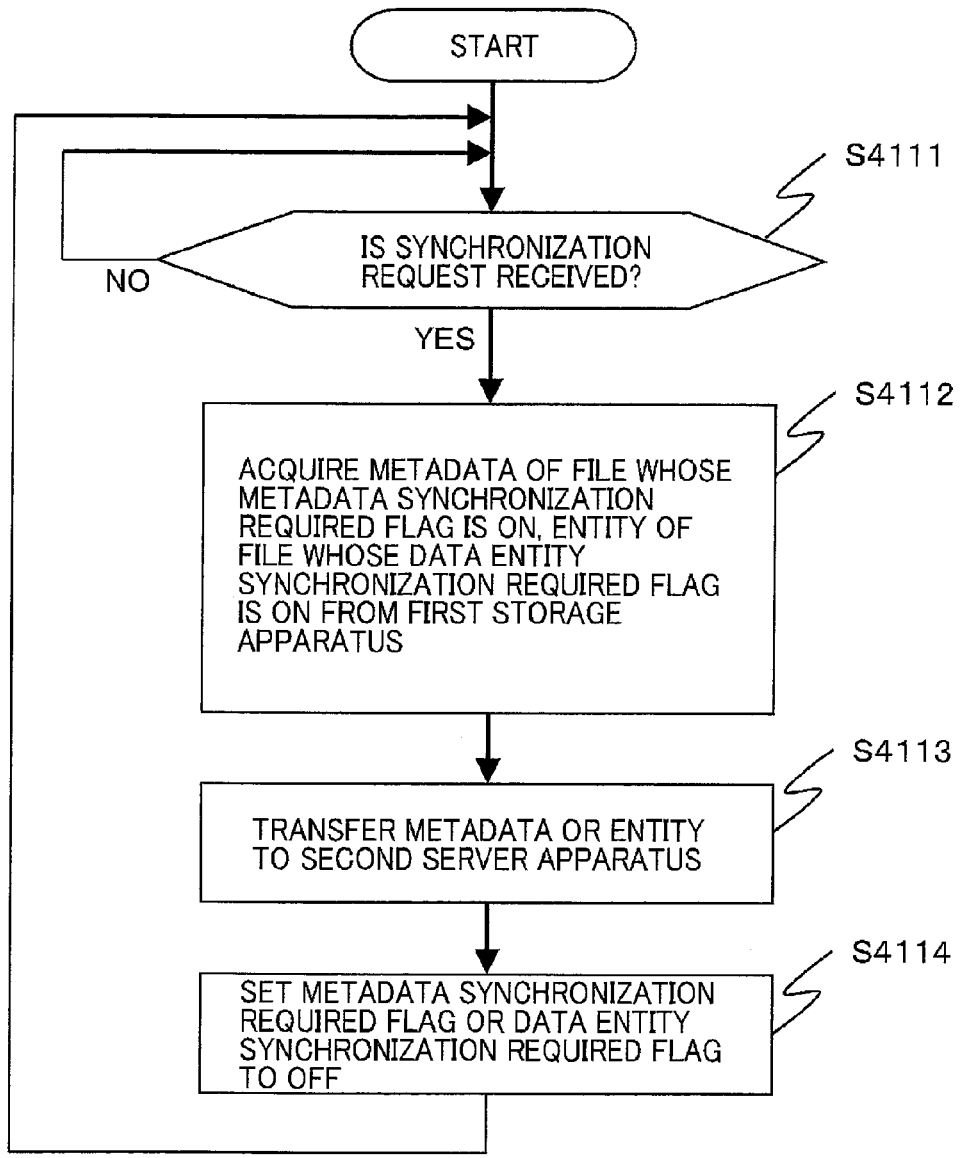
FIG. 41 is a flowchart explaining synchronization processing S4100.

FIG. 41 is a flowchart explaining the processing performed by the first server apparatus 3a (hereinafter, referred to as synchronization processing S4100) when the first server apparatus 3a receives the above-described synchronization request for a file stored in the first storage apparatus 10a.

The first server apparatus 3a, when receiving a synchronization request (S4111: YES), acquires the metadata of the files for which the metadata synchronization required flag 2112 is set to ON, and the entity of the files for which the data entity synchronization required flag 2113 is set to ON from the files stored in the first storage apparatus 10a, and transfers the acquired metadata and entity to the second server apparatus 3b (S4113). Also, the first server apparatus 3a sets the metadata synchronization required flag 2112 and the data entity synchronization required flag 2113 of the transferred files to OFF (S4114).

Figure 42:
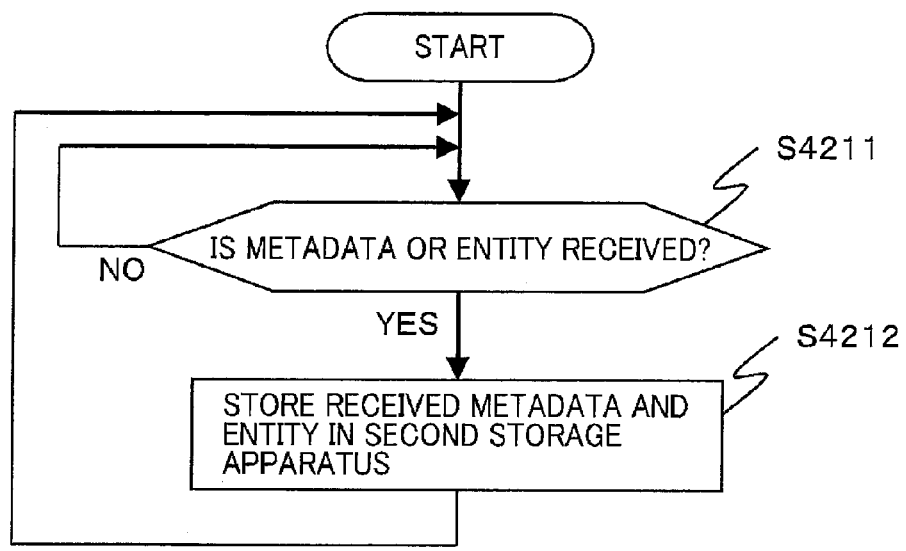
FIG. 42 is a flowchart explaining file storing processing S4200.

FIG. 42 is a flowchart explaining the processing performed by the second server apparatus 3b (hereinafter, referred to as file storing processing S4200) when the second server apparatus 3b receives the metadata or entity sent from the first server apparatus 3a due to the above-described replication processing S4000 or the above-described synchronization processing S4100.

The second server apparatus 3b, when receiving the metadata or entity from the first server apparatus 3a (S4211), stores the received metadata or entity in the second storage apparatus 10b (S4212).

Figure 43:
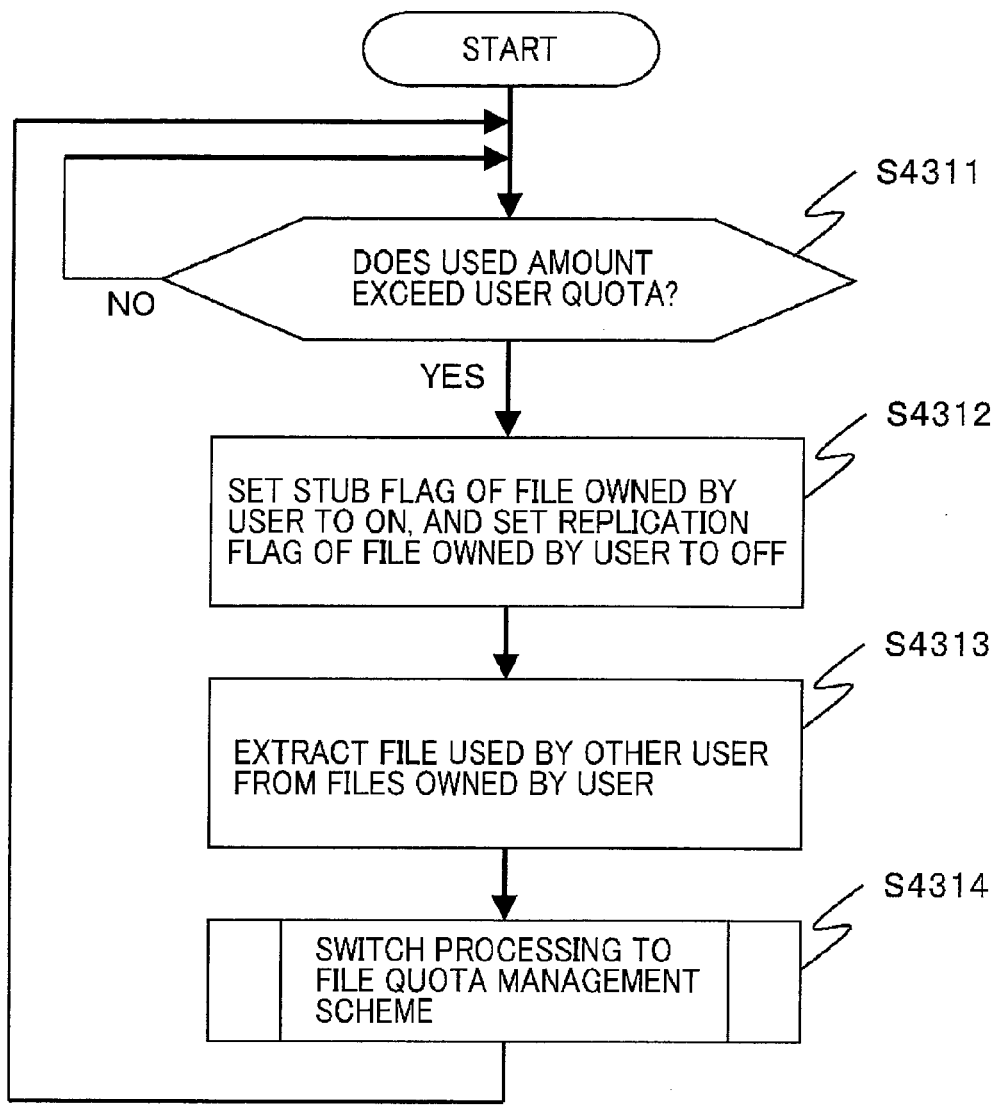
FIG. 43 is a flowchart explaining user quota excess detection processing S4300.

FIG. 43 is a flowchart explaining the processing performed by the first server apparatus 3a (hereinafter, referred to as user quota excess detection processing S4300) when the first server apparatus 3a detects that the used amount of a user exceeds the user quota 3312.

The first server apparatus 3a refers to the user quota management table 331 to monitor whether or not the used amount 3313 of each user exceeds the user quota 3312 as needed (periodically, in real time, and the like) (S4311). If the first server apparatus 3a detects that the used amount 3313 of a user exceeds the user quota 3312 (S4311: YES), the first server apparatus 3a sets the stub flag 2111 of each file owned by the user to ON, and sets the replication flag 2114 of the file to OFF (S4312).

The first server apparatus 3a then refers to the file access log 335 to extract files that are used (shared) by other users as well from the files owned by the user (S4313), and performs switching to the file quota management scheme for targeting the extracted files (S4314). Subsequently, the processing returns to S4311, and starts to monitor whether or not the used amount 3313 of each user exceeds the user quota 3312.

Figure 44:
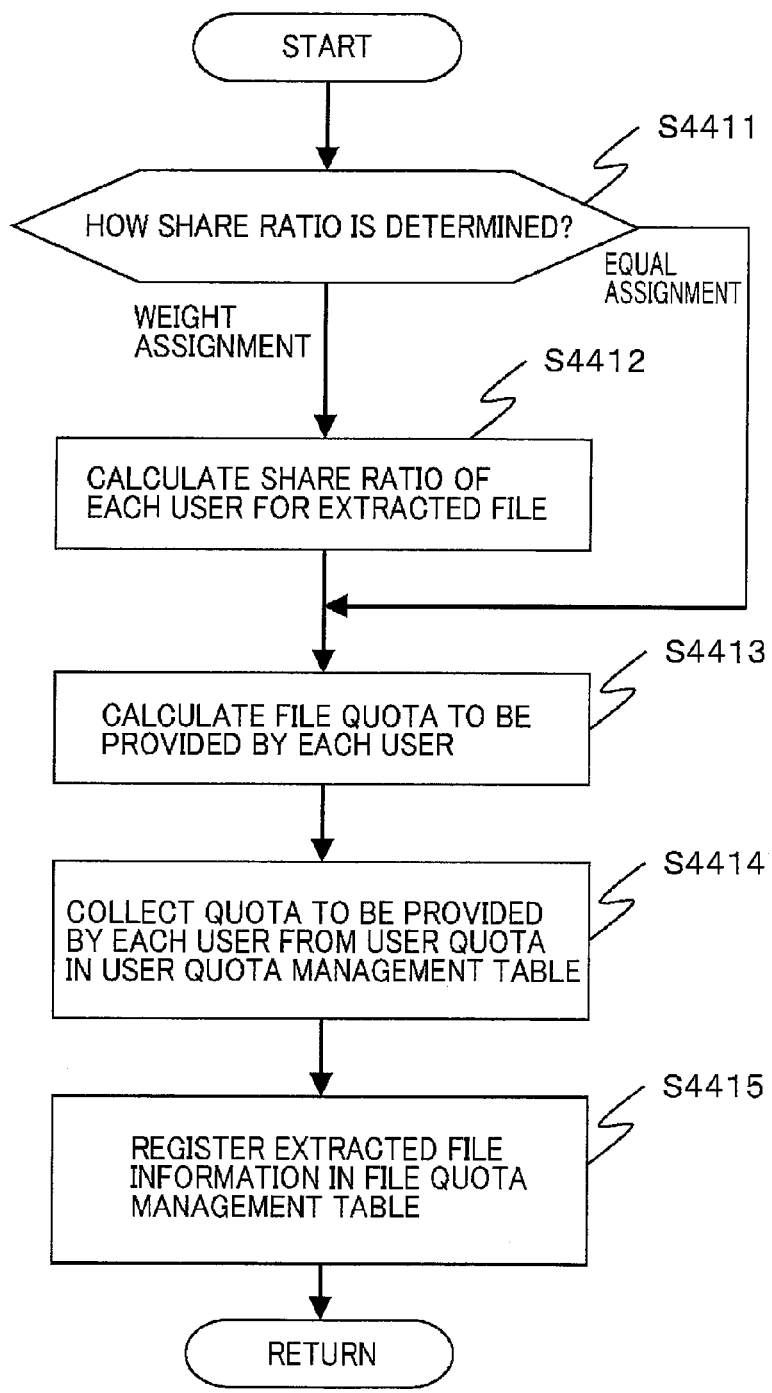
FIG. 44 is a flowchart explaining file quota management scheme transition processing S4400.

FIG. 44 is a flowchart explaining the processing in S4314 of FIG. 43 (hereinafter, referred to as switch processing to the file quota management scheme S4400). The processing shown in FIG. 44 is performed for each of the extracted files in S4313 of FIG. 43. In the following, description is given in conjunction with FIG. 44.

Initially, the first server apparatus 3a, when switching to the file quota management scheme for each extracted file, acquires a share ratio determination method for the file quota of the file (S4411). The share ratio determination method includes, for example, the method by weight assignment and the method by equal assignment described above. Here, description is given assuming that these two determination methods are available. The above-mentioned determination methods are acquired, for example, by referring to the information preset for each file's owner. If the method by weight assignment is acquired (S4411: weight assignment), the processing proceeds to S4412; and if the method by equal assignment is acquired (S4411: equal assignment), the processing proceeds to S4413.

In S4412, the first server apparatus 3a calculates the share ratio of the users for the extracted file (S4412).

In S4413, the first server apparatus 3a calculates the file quota to be provided by each user. In the case of the determination method by weight assignment, the file quota to be provided by each user is calculated by using the share ratio calculated in S4412. In the case of the determination method by equal assignment, the file quota to be provided by each user is calculated by equally dividing the file size of the extracted file by the number of the users using the file.

In S4414, the first server apparatus 3a subtracts the file quota to be provided by each user from the user quota 3312 of each user managed in the user quota management table 331.

In S4415, the first server apparatus 3 registers the information for managing the extracted file by the file quota management scheme to the file quota management table 332.

Figure 45:
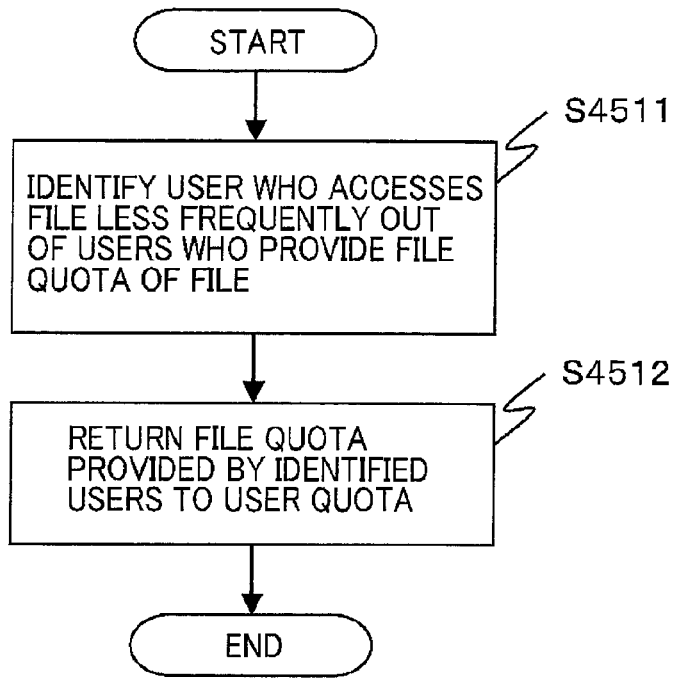
FIG. 45 is a flowchart explaining file quota return processing S4500.

FIG. 45 shows the processing performed by the first server apparatus 3a to return a share of the file quota to those users who have less access to the file (hereinafter, referred to as a file quota return processing S4500) among the users who provide the file quota of the files managed by the file quota management scheme (the file quota is changed to the user quota). The file quota return processing S4500 is performed as needed (periodically, in real time, and the like). Also, the processing shown in FIG. 45 is performed individually for each file managed in the file quota management table 332.

Initially, the first server apparatus 3a refers to the file access log 335, and for each file managed in the file quota management table 332, identifies the users who have less access to the file (the user for which the number of access to the file between a predetermined past time and the current time is a preset threshold or less) (S4511).

Next, the first server apparatus 3a returns the file quota provided by each identified user to the user quota (S4512). Specifically, this returning is performed by adding the file quota (in all or in part) provided by the user in the file quota management table 332 to the user quota 3312 of the user in the user quota management table 331, and subtracting the added value from the provided quota by the user in the file quota management table 332, and then increasing the provided quota by other users for the file accordingly (so that the value of the file quota 3322 before the subtraction is maintained).

In this manner, a user quota is automatically returned to each user who has less access to the files managed by the file quota management scheme, thus the file quota can be fairly provided by the users.

Figure 46:
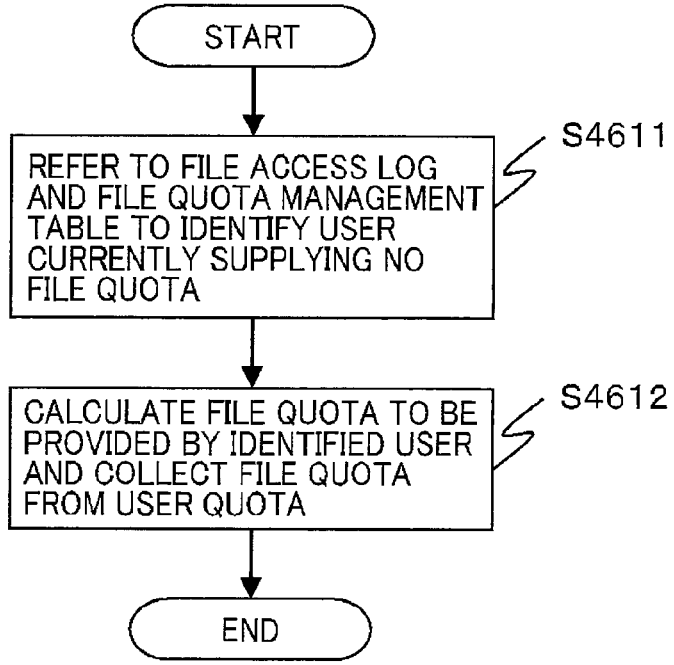
FIG. 46 is a flowchart explaining file quota collection processing S4600.

FIG. 46 is a flowchart explaining the processing performed by the first server apparatus 3a to extract those users who use a file managed by the file quota management scheme but do not currently provide a file quota based on the file access log 335, and to collect the file quota of the file from the extracted users (hereinafter, referred to as a file quota collection processing S4600). The file quota collection processing S4600 is performed as needed (periodically, in real time, and the like). Also, the processing shown in FIG. 46 is performed individually for each file managed in the file quota management table 332.

Initially, the first server apparatus 3a compares the file access log 335 with the file quota management table 332 to identify those users who use a file managed by the file quota management scheme but do not currently provide a file quota (hereinafter, referred to as a collection candidate user) based on the file access log 335 (S4611). Specifically, the first server apparatus 3a extracts, for example, users whose number of access to the file between a predetermined past time and the current time exceeds a preset threshold as a collection candidate user.

The first server apparatus 3a then calculates the file quota to be provided by each collection candidate user (for example, the file quota is calculated using the method by weight assignment or equal assignment described above), and updates the file quota management table 332 and the user quota management table 331 based on the calculated result (S4612).

In this manner, for a file managed by the file quota management scheme, if the access frequency of a user who does not supply a file quota is increased, a file quota is automatically collected from the user, thus the file quota can be fairly provided by the users.

Figure 47:
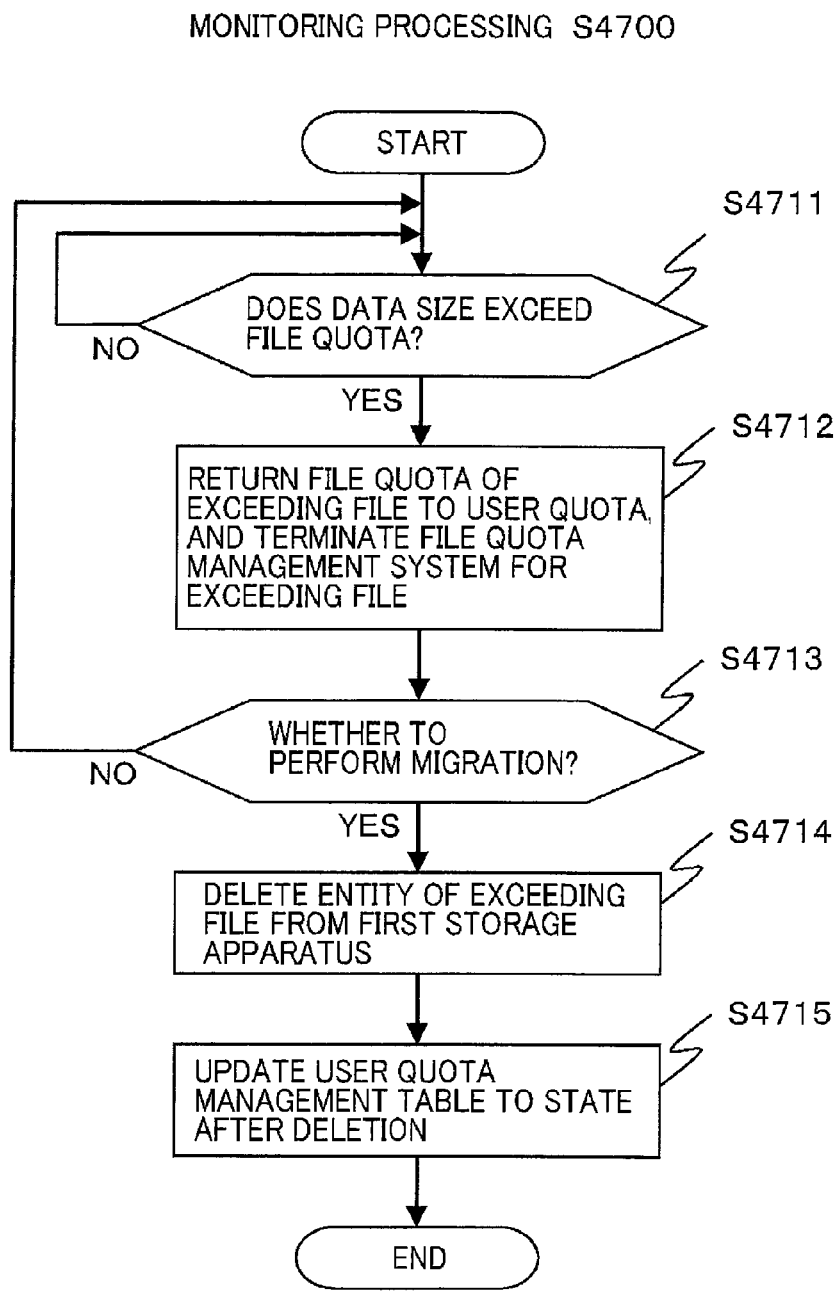
FIG. 47 is a flowchart explaining monitoring processing S4700.

FIG. 47 is a flowchart explaining the processing related to the switching to the user quota management scheme for a file managed by the file quota management scheme, and to execution of migration of a file managed by the user quota management scheme (hereinafter, referred to as a monitoring processing S4700).

The first server apparatus 3a determines whether the file size of each file managed by the file quota management scheme (hereinafter, referred to as a target file) exceeds the file quota as needed (periodically, in real time, at a preset timing, and the like) (S4711). If the first server apparatus 3a determines that the file size of the target file exceeds the file quota (S4711: YES), the processing proceeds to S4712.

In S4712, the first server apparatus 3a returns the entire file quota of the target file to the user quota, and terminates the management by the file quota management scheme. The first server apparatus 3a updates the content of the user quota management table 331 and the file quota management table 332 to the state after the returning.

The first server apparatus 3a then determines whether or not migration is to be performed (S4313). Whether migration should be performed or not is determined, for example, based on whether or not the used amount 3313 exceeds a predetermined threshold of the user quota 3312 by referring to the user quota management table 331. If the migration is to be performed (S4713: YES), the processing proceeds to S4714; and if the migration is not to be performed (S4713: NO), the processing returns to S4711.

In S4714, the first server apparatus 3a deletes the entity of the target file from the first storage apparatus 10a, and migrates (stubs) the file. The first server apparatus 3a updates the user quota management table 331 to the state after the deletion (S4715).

Figure 48:
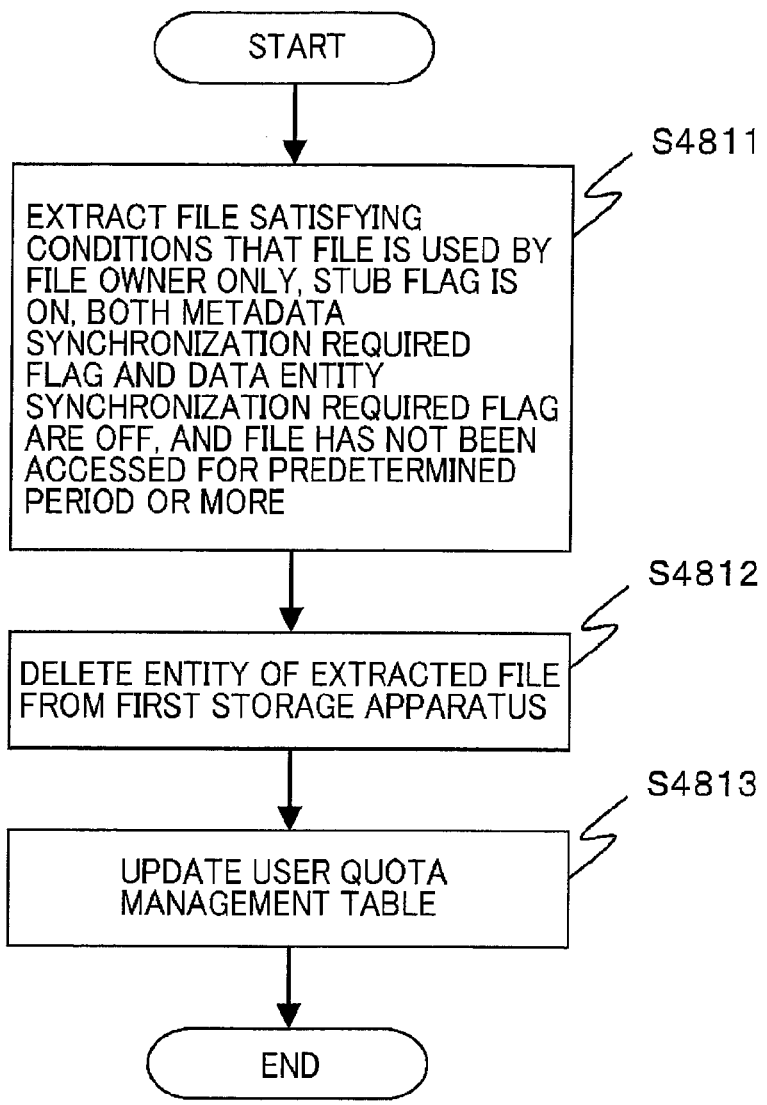
FIG. 48 is a flowchart explaining monitoring processing S4800.

FIG. 48 is a flowchart explaining the processing of migrating (stubbing) each file used by its owner only (hereinafter, referred to as monitoring processing S4800). The monitoring processing S4800 is performed by the first server apparatus 3a as needed (periodically, in real time, and the like).

The first server apparatus 3a extracts those files from the files stored in the first storage apparatus 10a that are used by their owners only (files that have not been accessed by other users between a predetermined past time and the current time), and their stub flag 2111 is set to ON, and both their metadata synchronization required flag 2112 and the data entity synchronization required flag 2113 are set to OFF, and access to them has not been made for at least a predetermined period (S4811).

The first server apparatus 3a then deletes the entity of each extracted file (execution of migration) from the first storage apparatus 10a (S4812), and updates the user quota management table 331 to the state after the file deletion (S4813).

As described above, according to the information processing system 1 of the present embodiment, in the management based on user quota, out of the target files to be migrated (even if a file is set as a target to be managed by the migration management scheme, the file is not necessarily immediately started to be managed by the migration management scheme), the files currently used by a plurality of users are set as a target to be managed based on a file quota. Thus, even if a certain file is set as a target of migration in the management based on user quota, if the file is used (shared) by a plurality of users, the file is excluded from the target of the management based on user quota, and is placed under the management based on a file quota (FIG. 43).

In this manner, according to the information processing system 1 of the present embodiment, in order to prevent shortage of the storage resources provided to the file system 312, the management based on user quota is basically performed. However, even if the user quota is exceeded, the file that is used by a plurality of users is excluded from the target of the user quota management scheme, in which necessity of migration may be determined by only the convenience of a specific user (owner user), and is set as a target to be managed by the file quota management scheme, in which the user quota is supplied by multiple users. Thus, while the file is in the targets to be managed by the file quota management scheme, migration of the file only for the convenience of specific users that adversely affect the service for other users can be prevented.

Also, if the capacity of a file set as a target of the management based on file quota exceeds a threshold based on file quota, the file is excluded from the target of the management based on file quota, and is again set as a target of the management based on user quota (FIG. 47), thus the storage resources provided to the file system 312 is secured. Thus, according to the information processing system 1 of the present embodiment, migration to secure the storage resources can be properly performed while suppressing an adverse effect caused by the migration on other users.

Also, if the capacity of a file exceeds the file quota due to update of the file, user quotas are collected from users who use the file as needed, and the collected portion is added to the file quota (FIG. 36), thus frequent exclusion of the file from the management by file quota due to the update can be prevented (in principle the file is excluded from the management by file quota, and returns to the management by user quota only by the determination by the monitoring processing (FIG. 47)).

Also, a user quota is automatically returned to a user who has less access to the files managed by the file quota management scheme (FIG. 45), thus the file quota can be fairly provided by the users. Also, for a file managed by the file quota management scheme, if the access frequency of a user who does not supply a file quota is increased, a file quota is automatically collected from the user, thus the file quota can be fairly provided by the users (FIG. 46).

Although an embodiment of the present invention has been described, the above described embodiment is h merely for facilitating the understanding of the present invention and does not intend to restrict the scope of the present invention.

The present invention can be modified or improved without departing from the spirit thereof and includes its equivalents.

The invention claimed is:

1. A server apparatus comprising one or more processors, the server apparatus is a first server apparatus communicatively coupled to a client apparatus, a first storage apparatus that stores a plurality of files, and a second server apparatus that is communicatively coupled to a second storage apparatus, wherein the first server apparatus is configured to:
   perform writing or reading of data of a file stored in the first storage apparatus, when receiving an access request to the file from the client apparatus;
   manage a user quota that is information defining a limit of a used amount of storage resources by each user;
   perform management based on the user quota where the file owned by a user is set as a target of migration to the second storage apparatus, when the used amount of the user exceeds a threshold based on the user quota;
   exclude the file, out of other of the files specified as targets of migration, used by a plurality of users from a target of the management based on the user quota, and set the file as a target of management based on a file quota that is information defining a limit of capacity for each file, the file quota configured from a plurality of parts of the user quota supplied from each of users who use the file; and
   stub the file by deleting entity of the file from the first storage apparatus and leaving metadata of the file, when the file has not been accessed by other users for a period of time, if the file is the target of management based on the user quota,
   collect a respective user quota from each of users who use the file according to access frequency to the file by the user, and set the collected user quota as the file quota when setting the file as a target of the management based on the file quota.

2. The server apparatus according to claim 1, wherein the first server apparatus is configured to:
   collect a respective user quota from each of users who use the file, evenly or according to access frequency to the file by the user, and set the collected user quota as the file quota when setting the file as a target of the management based on the file quota;
   determine whether a capacity of the file exceeds the threshold based on the file quota due to an update based on an update request when receiving the update request to the file stored in the first storage from the client apparatus, and again collect the user quota of users who use the file and add the user quota to the file quota if the threshold is exceeded;
   return a file quota supplied by a user to the user quota of the user when access frequency to the file that is a target of the management based on the file quota by the user who supplies the user quota for the file is equal to or smaller than a preset threshold;
   collect the user quota from a user and add the user quota to the file quota of the file when access frequency to the file that is a target of the management based on the file quota by the user who does not supply the user quota for the file exceeds a preset threshold;
   open the file and increment a reference counter of the file when receiving an open request to the file stored in the first storage from the client apparatus;
   close the file and decrement the reference counter of the file when receiving a close request to the file stored in the first storage from the client apparatus;
   stub the file by deleting entity of the file from the first storage apparatus and leaving metadata of the file in a case where the reference counter of the file stored in the first storage takes a value of 0 after the file is closed in response to receiving the close request to the file from the client apparatus, and where the file is used by only its owner;
   transfer data of the file to the second storage apparatus via the second server apparatus and set the file as a target of management by replication when a replication request is generated to the file stored in the first storage apparatus;
   stub the file by deleting entity of the file from the first storage apparatus and leaving metadata of the file when the first server apparatus migrates the file to the second storage apparatus, the file being a target of the management by the replication and the target of migration in the management based on the user quota;
   manage information indicating that synchronization processing is required to match contents of files for files that are targets of the management by the replication, when there is an unmatched content between the data of a file stored in the first storage apparatus and the data of a file stored in the second storage apparatus; and
   exclude the file from a target of the migration, the file specified as requiring the synchronization processing according to the information.

3. The server apparatus according to claim 1, wherein the first server apparatus is configured to
   collect a respective user quota from each of users who use the file, evenly or according to access frequency to the file by the user, and set the collected user quota as the file quota when setting the file as a target of the management based on the file quota.

4. The server apparatus according to claim 1, wherein the first server apparatus is configured to
   determine whether a capacity of the file exceeds the threshold based on the file quota due to an update based on an update request when receiving the update request to the file stored in the first storage from the client apparatus, and again collect the user quota of users who use the file and add the user quota to the file quota if the threshold is exceeded.

5. The server apparatus according to claim 1, wherein the first server apparatus is configured to
   return a file quota supplied by a user to the user quota of the user when access frequency to the file that is a target of the management based on the file quota by the user who supplies the user quota for the file is equal to or smaller than a preset threshold.

6. The server apparatus according to claim 1, wherein the first server apparatus is configured to
   collect the user quota from a user and add the user quota to the file quota of the file when access frequency to the file that is a target of the management based on the file quota by the user who does not supply the user quota for the file exceeds a preset threshold.

7. The server apparatus according to claim 1, wherein the first server apparatus is configured to:
   open the file and increment a reference counter of the file when receiving an open request to the file stored in the first storage from the client apparatus;
   close the file and decrement the reference counter of the file when receiving a close request to the file stored in the first storage from the client apparatus; and
   stub the file by deleting entity of the File from the first storage apparatus and leaving metadata of the file in a case where the reference counter of the file stored in the first storage takes a value of 0 after the file is closed in response to receiving the close request to the file from the client apparatus, and where the file is used by only its owner.

8. The server apparatus according to claim 1, wherein the first server apparatus is configured to transfer data of the file to the second storage apparatus via the second server apparatus and set the file as a target of management by replication when a replication request is generated to the file stored in the first storage apparatus; and stub the file by deleting entity of the file from the first storage apparatus and leaving metadata of the file when the first server apparatus migrates the file to the second storage apparatus, the file being a target of the management by the replication and the target of migration in the management based on the user quota.

9. The server apparatus according to claim 8, wherein the first server apparatus is configured to:

manage information indicating that synchronization processing is required to match contents of files for files that are targets of the management by the replication, when there is an unmatched content between the data of a file stored in the first storage apparatus and the data of a file stored in the second storage apparatus; and exclude the file from a target of the migration, the file specified as requiring the synchronization processing according to the information.

10. The server apparatus according to claim 1, further comprising:

excluding, by the first server apparatus, the file from a target of the management based on the file quota, and setting the file as a target of the management based on the user quota when a capacity of the file set as a target of the management based on the file quota exceeds a threshold based on the file quota.

11. A control method of a server apparatus that is a first server apparatus communicatively coupled to a client apparatus, a first storage apparatus, and a second server apparatus that is communicatively coupled to a second storage apparatus, comprising:

performing, by the first server apparatus, writing or reading of data of a file stored in the first storage apparatus, when receiving an access request to the file from the client apparatus;

managing, by the first server apparatus, a user quota that is information defining a limit of a used amount of storage resources by each user;

performing, by the first server apparatus, management based on the user quota where the file owned by a user is set as a target of migration to the second storage apparatus when the used amount of the user exceeds a threshold based on the user quota;

excluding, by the first server apparatus, the file, out of other of the files specified as targets of migration, used by a plurality of users from a target of the management based on the user quota, and setting the file as a target of management based on a file quota that is information defining a limit of capacity for each file, the file quota configured from a plurality of parts of the user quota supplied from each of users who use the file; and stubbing, by the first server apparatus, the file by deleting entity of the file from the first storage apparatus and leaving metadata of the file, when the file has not been accessed by other users for a period of time, if the file is the target of management based on the user quota, collecting, by the first server apparatus, a respective user quota from each of users who use the file according to access frequency to the file by the user, and setting the collected user quota as the file quota when setting the file as a target of the management based on the file quota.

12. The control method of the server apparatus according to claim 11, further comprising:

collecting, by the first server apparatus, a respective user quota from each of users who use the file, evenly or according to access frequency to the file by the user, and setting the collected user quota as the file quota when setting the file as a target of the management based on the file quota.

13. The control method of the server apparatus according to claim 11, further comprising:

determining, by the first server apparatus, whether a capacity of the file exceeds the threshold based on the file quota due to an update based on an update request when receiving the update request to the file stored in the first storage from the client apparatus, and again collecting the user quota of users who use the file and adding the user quota to the file quota if the threshold is exceeded.

14. The control method of the server apparatus according to claim 11, further comprising:

returning, by the first server apparatus, a file quota supplied by a user to the user quota of the user when access frequency to the file that is a target of the management based on the file quota by the user who supplies the user quota for the file is equal to or smaller than a preset threshold.

15. The control method of the server apparatus according to claim 11, further comprising:

excluding, by the first server apparatus, the file from a target of the management based on the file quota, and setting the file as a target of the management based on the user quota when a capacity of the file set as a target of the management based on the file quota exceeds a threshold based on the file quota.

* * * * *